US012579035B2

(12) United States Patent
Lee et al.

(10) Patent No.: US 12,579,035 B2
(45) Date of Patent: Mar. 17, 2026

(54) STORAGE SYSTEM AND DATA CENTER INCLUDING THE SAME

(71) Applicant: SAMSUNG ELECTRONICS CO., LTD., Suwon-si (KR)

(72) Inventors: Seunghan Lee, Suwon-si (KR); Juhwan Lim, Suwon-si (KR); Sanghun Jun, Suwon-si (KR); Bumjun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/618,856

(22) Filed: Mar. 27, 2024

(65) Prior Publication Data

US 2025/0094281 A1      Mar. 20, 2025

(30) Foreign Application Priority Data

Sep. 18, 2023      (KR) ........................ 10-2023-0123706

(51) Int. Cl.
*G06F 11/10*          (2006.01)
*G06F 1/30*           (2006.01)
*G06F 13/40*          (2006.01)
(52) U.S. Cl.
CPC .............. *G06F 11/108* (2013.01); *G06F 1/30* (2013.01); *G06F 13/4022* (2013.01)
(58) Field of Classification Search
CPC .......... G06F 11/108; G06F 11/10; G06F 1/30; G06F 13/4022
See application file for complete search history.

(56) References Cited

U.S. PATENT DOCUMENTS

| | | | | |
|---|---|---|---|---|
| 9,760,430 B2* | 9/2017 | Farhan | ................ | G06F 11/0751 |
| 10,140,063 B2* | 11/2018 | Worley | ................ | G06F 3/0661 |
| 10,754,785 B2* | 8/2020 | Zhang | ................ | G06F 12/1009 |
| 11,816,337 B2* | 11/2023 | Hahn | .................... | G06F 3/0679 |
| 11,847,071 B2* | 12/2023 | Kirkpatrick | ........... | G06F 3/0613 |

(Continued)

FOREIGN PATENT DOCUMENTS

| | | |
|---|---|---|
| CN | 106201766 | 3/2018 |
| CN | 109460129 | 10/2021 |

(Continued)

OTHER PUBLICATIONS

Extended European Search Report in European Appln. No. 24165863.2, mailed on Sep. 20, 2024, 11 pages.

*Primary Examiner* — Kamini B Patel
(74) *Attorney, Agent, or Firm* — Fish & Richardson P.C.

(57) ABSTRACT

A storage system includes a plurality of DRAM-less storage devices, a CXL memory expander, and a PLP capacitor. The DRAM-less storage devices include nonvolatile memories as a storage medium, and a DRAM is omitted in the DRAM-less storage devices. The CXL memory expander is electrically connected to the DRAM-less storage devices, communicates through a CXL interface and operates as a buffer memory of the DRAM-less storage devices. The PLP capacitor is electrically connected to the DRAM-less storage devices and the CXL memory expander, is disposed outside the DRAM-less storage devices, and supplies an auxiliary power voltage to the DRAM-less storage devices and the CXL memory expander in a SPO condition in which an external power voltage is suddenly turned off.

20 Claims, 26 Drawing Sheets

(56)         References Cited

U.S. PATENT DOCUMENTS

| | | | | |
|---|---|---|---|---|
| 12,175,119 | B2 * | 12/2024 | Hahn | G06F 13/4022 |
| 2009/0083476 | A1 * | 3/2009 | Pua | G06F 3/0688 |
| | | | | 711/103 |
| 2017/0185347 | A1 * | 6/2017 | Flynn | G06F 3/0619 |
| 2020/0043549 | A1 * | 2/2020 | Shibata | G11C 16/32 |
| 2021/0334044 | A1 * | 10/2021 | Harada | G06F 3/0673 |
| 2022/0137865 | A1 * | 5/2022 | Lee | G06F 3/0655 |
| | | | | 711/154 |
| 2022/0188010 | A1 * | 6/2022 | Li | G06F 3/0664 |
| 2023/0017643 | A1 * | 1/2023 | Shah | G06F 12/0813 |
| 2023/0093359 | A1 * | 3/2023 | Segev | G06F 3/0679 |
| | | | | 711/154 |
| 2023/0176744 | A1 * | 6/2023 | Hahn | G06F 3/0616 |
| 2023/0176775 | A1 * | 6/2023 | Hahn | G06F 13/4022 |
| | | | | 711/154 |
| 2023/0288974 | A1 * | 9/2023 | Olarig | G06F 3/0679 |
| 2023/0376216 | A1 * | 11/2023 | Lee | G06F 12/1009 |
| 2023/0376217 | A1 * | 11/2023 | Lee | G06F 3/0673 |
| 2024/0273013 | A1 * | 8/2024 | Yi | G06F 12/0246 |

FOREIGN PATENT DOCUMENTS

| | | |
|---|---|---|
| CN | 111639037 | 6/2023 |
| CN | 116665727 | 8/2023 |
| WO | WO 2010111694 | 9/2010 |
| WO | WO 2023130060 | 7/2023 |

* cited by examiner

Figure 9:
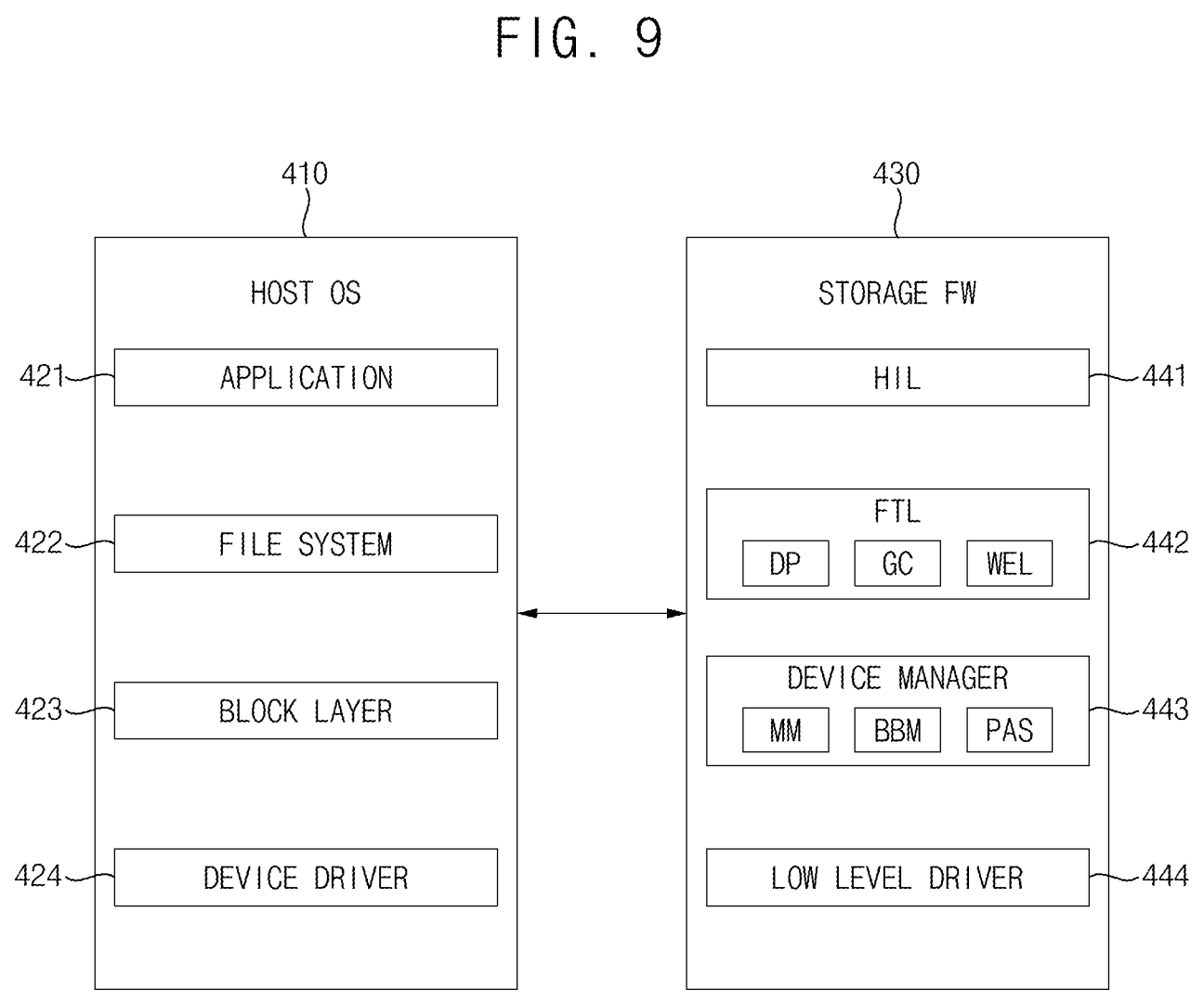

430 STORAGE FW

441 HIL

442 FTL
DP | GC | WEL

443 DEVICE MANAGER
MM | BBM | PAS

444 LOW LEVEL DRIVER

410 HOST OS

421 APPLICATION

422 FILE SYSTEM

423 BLOCK LAYER

424 DEVICE DRIVER

Figure 21:
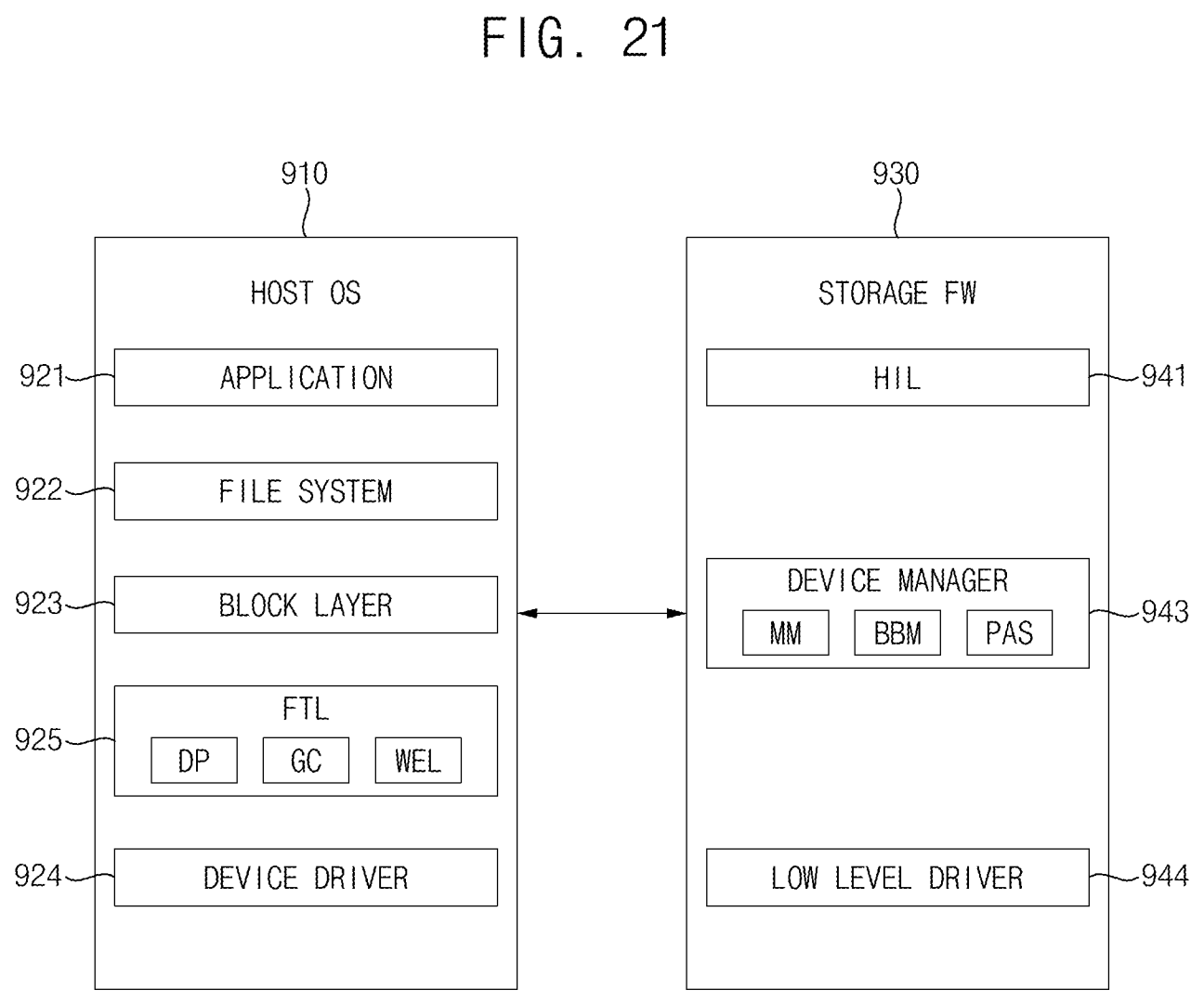

910 — HOST OS

921 — APPLICATION

922 — FILE SYSTEM

923 — BLOCK LAYER

925 — FTL — DP | GC | WEL

924 — DEVICE DRIVER

930 — STORAGE FW

941 — HIL

943 — DEVICE MANAGER — MM | BBM | PAS

944 — LOW LEVEL DRIVER

Figure 23:
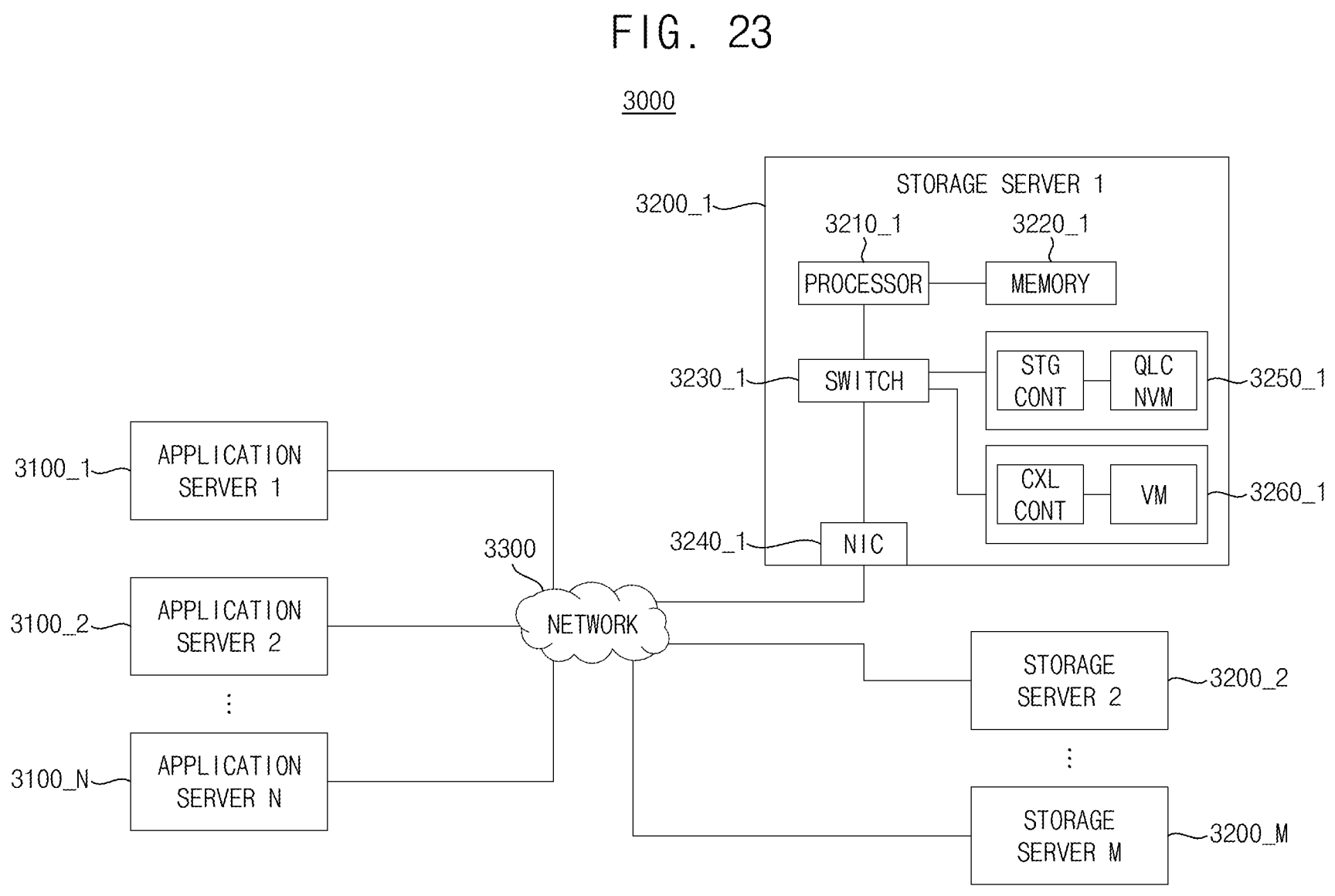

STORAGE SERVER 1　3200_1

3210_1　PROCESSOR

3220_1　MEMORY

STG CONT　QLC NVM　3250_1

CXL CONT　VM　3260_1

SWITCH　3230_1

NIC　3240_1

STORAGE SERVER 2　3200_2

STORAGE SERVER M　3200_M

NETWORK　3300

APPLICATION SERVER 1　3100_1

APPLICATION SERVER 2　3100_2

APPLICATION SERVER N　3100_N

STORAGE SYSTEM AND DATA CENTER INCLUDING THE SAME

CROSS-REFERENCE TO RELATED APPLICATION

This application claims priority under 35 USC § 119 to Korean Patent Application No. 10-2023-0123706 filed on Sep. 18, 2023 in the Korean Intellectual Property Office (KIPO), the contents of which are herein incorporated by reference in their entirety.

BACKGROUND

One or more semiconductor memory devices may be used in data storage devices. Examples of such data storage devices include solid state drives (SSDs). SSDs typically use flash memory and function as secondary storage. SSDs may have various design and/or performance advantages over hard disk drives (HDDs). Examples of these advantages include the absence of moving mechanical parts, higher data access speeds, stability, durability, and/or low power consumption. Various systems, e.g., one or more of a laptop computer, a car, an airplane, a drone, etc., have adopted SSDs for data storage.

When storage systems including storage devices are to be applied to storage servers, the performance and cost of the storage servers may have a trade-off relationship. For example, storage servers with high performance may require memory devices having high performance, which are expensive products. In another example, in storage servers implemented to store large amounts of data, memory devices having large storage capacity rather than high performance may be required, and these memory devices may be low-cost products.

SUMMARY

The present disclosure relates generally to semiconductor integrated circuits, and more particularly to storage systems, and data centers including the storage systems. In some implementations, such storage systems are capable of having improved performance with large capacity and low cost.

In general, aspects of the subject matter described in this specification can include a storage system including: a plurality of DRAM-less storage devices, at least one compute express link (CXL) memory expander, and a power loss protection (PLP) capacitor. Each of the plurality of DRAM-less storage devices includes a plurality of nonvolatile memories as a storage medium, and a dynamic random access memory (DRAM) is omitted in each of the plurality of DRAM-less storage devices as a buffer memory. The at least one CXL memory expander is electrically connected to the plurality of DRAM-less storage devices, communicates through a CXL interface and operates as a buffer memory of the plurality of DRAM-less storage devices. The PLP capacitor is electrically connected to the plurality of DRAM-less storage devices and the at least one CXL memory expander, is disposed outside the plurality of DRAM-less storage devices, and supplies an auxiliary power voltage to the plurality of DRAM-less storage devices and the at least one CXL memory expander in a sudden power off (SPO) condition in which an external power voltage is suddenly turned off. The at least one CXL memory expander includes a first memory region allocated as a dedicated area for the plurality of DRAM-less storage devices. The first memory region stores mapping data including mapping information corresponding to a plurality of user data stored in the plurality of nonvolatile memories included in the plurality of DRAM-less storage devices.

Another general aspect can include a data center including: a plurality of application servers and a plurality of storage servers. The plurality of application servers receive a data write request or a data read request. The plurality of storage servers store write data corresponding to the data write request or output read data corresponding to the data read request. A first storage server among the plurality of storage servers includes a plurality of first DRAM-less storage devices, at least one first compute express link (CXL) memory expander, and a first power loss protection (PLP) capacitor. Each of the plurality of first DRAM-less storage devices includes a plurality of nonvolatile memories as a storage medium, and a dynamic random access memory (DRAM) is omitted in each of the plurality of first DRAM-less storage devices as a buffer memory. The at least one first CXL memory expander is electrically connected to the plurality of first DRAM-less storage devices, communicates through a CXL interface, and operates as a buffer memory of the plurality of first DRAM-less storage devices. The first PLP capacitor is electrically connected to the plurality of first DRAM-less storage devices and the at least one first CXL memory expander, is disposed outside the plurality of first DRAM-less storage devices, and supplies an auxiliary power voltage to the plurality of first DRAM-less storage devices and the at least one first CXL memory expander in a sudden power off (SPO) condition in which an external power voltage is suddenly turned off. The at least one first CXL memory expander includes a first memory region allocated as a dedicated area for the plurality of first DRAM-less storage devices. The first memory region stores mapping data including mapping information corresponding to a plurality of user data stored in the plurality of nonvolatile memories included in the plurality of first DRAM-less storage devices.

Another general aspect can include a storage system including: a host device, a plurality of quadruple-level cell (QLC) DRAM-less storage devices controlled by the host device, at least one compute express link (CXL) memory expander controlled by the host device, at least one accelerator formed separately from the host device, and a power loss protection (PLP) capacitor. Each of the plurality of QLC DRAM-less storage devices includes a plurality of QLC nonvolatile memories including a plurality of QLCs configured to store 4-bit data as a storage medium, and a dynamic random access memory (DRAM) is omitted in each of the plurality of QLC DRAM-less storage devices as a buffer memory. The at least one CXL memory expander is electrically connected to the plurality of QLC DRAM-less storage devices, communicates through a CXL interface, and operates as a buffer memory of the plurality of QLC DRAM-less storage devices. The at least one accelerator is electrically connected to the plurality of QLC DRAM-less storage devices and the at least one CXL memory expander, performs a data processing function, and performs at least one of an erasure code function and an end-to-end data protection function for the plurality of QLC DRAM-less storage devices. The PLP capacitor is electrically connected to the plurality of QLC DRAM-less storage devices and the at least one CXL memory expander, is disposed outside the plurality of QLC DRAM-less storage devices and supplies an auxiliary power voltage to the plurality of QLC DRAM-less storage devices and the at least one CXL memory expander in a sudden power off (SPO) condition in which an external power voltage is suddenly turned off. The at least one CXL memory expander includes a first memory region allocated as a dedicated area for the plurality of QLC DRAM-less storage devices, and a second memory region configured to be accessed and managed by the host device. The first memory region stores mapping data including mapping information corresponding to a plurality of user data stored in the plurality of QLC nonvolatile memories included in the plurality of QLC DRAM-less storage devices. The at least one accelerator includes at least one nonvolatile memory. In the SPO condition, data stored in the at least one CXL memory expander is flushed to the at least one nonvolatile memory included in the at least one accelerator.

In the storage system and the data center, the CXL memory expander that operates as a buffer memory of the DRAM-less storage devices may be included, and the PLP capacitor that is disposed outside the DRAM-less storage devices may be included. Mapping data, write operations, etc. may be managed normally and/or stably by the CXL memory expander. Even in the SPO condition, the data loss may be prevented using the auxiliary power voltage supplied from the PLP capacitor. In addition, the erasure code function and the end-to-end data protection function may be performed by the accelerator and/or the computational storage device that are separately formed, or the DRAM-less storage devices may perform the enhanced error correction code function by itself, and thus the data integrity may be maintained. Accordingly, the storage system may have improved or enhanced performance with relatively large storage capacity and low manufacturing cost.

BRIEF DESCRIPTION OF THE DRAWINGS

FIGS. 2, 3A, 3B, 4, 5A and 5B are diagrams for describing an example of an operation of a storage system.

FIGS. 8, 9, 10 and 11 are diagrams illustrating an example of a DRAM-less storage device and a nonvolatile memory included in a storage system.

FIG. 15 is a diagram for describing an example of an operation of the storage system of FIG. 14.

FIG. 17 is a diagram illustrating an example of a computational storage device included in a storage system.

FIG. 18 is a diagram for describing an example of an operation of a storage system of FIG. 16.

FIGS. 20 and 21 are diagrams illustrating an example of a DRAM-less storage device included in the storage system of FIG. 19.

FIG. 22 is a diagram for describing an operation of the storage system of FIG. 19.

FIGS. 23 and 24 are block diagrams illustrating an example of a data center including a storage system.

Like reference numerals refer to like elements throughout this application.

DETAILED DESCRIPTION

Figure 1:
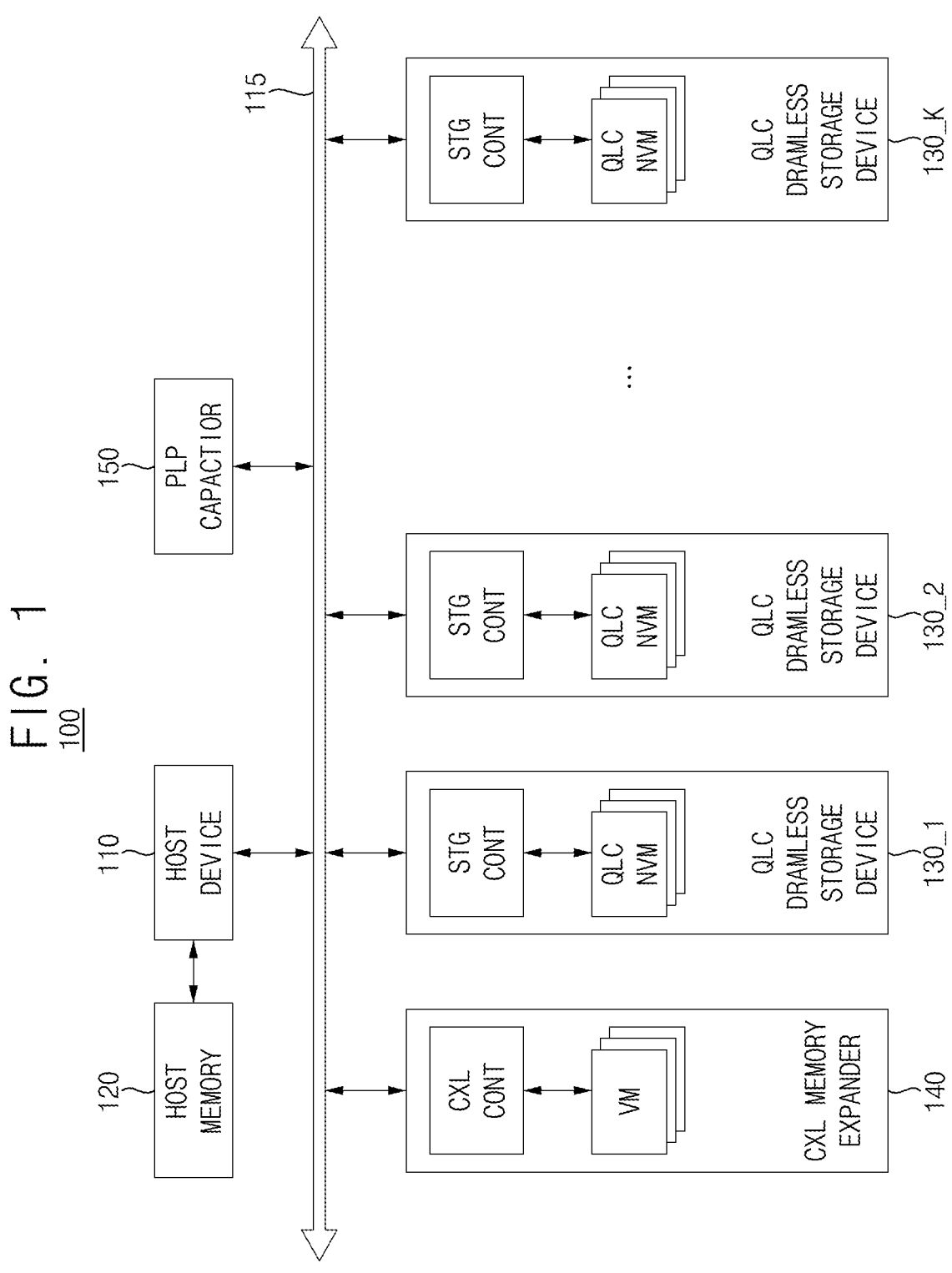
FIG. 1 is a block diagram illustrating an example of a storage system.

FIG. 1 is a block diagram illustrating an example of a storage system.

Referring to FIG. 1, a storage system 100 includes a plurality of DRAM-less storage devices 130_1, 130_2, . . . , 130_K, at least one compute express link (CXL) memory expander 140, and a power loss protection (PLP) capacitor 150, where K is a positive integer greater than or equal to two. The storage system 100 may further include a host device 110, a bus 115, and a host memory 120.

In some implementations, the storage system 100 may be one of various computing devices such as a personal computer (PC), a server computer, a data center, a workstation, a digital television (TV), a set-top box, etc. In some implementations, the storage system 100 may be one of various mobile devices such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

The host device 110 may control overall operations of the storage system 100. For example, the host device 110 may include at least one of various processing units, e.g., a central processing unit (CPU), etc. For example, the host device 110 may execute an operating system (OS). The OS may include, for example, a file system for file management and a device driver for controlling peripheral devices at the OS level.

The host memory 120 may be used as a main memory or system memory for the storage system 100. The host memory 120 may store instructions and/or data that are executed and/or processed by the host device 110. The host memory 120 may have a first form factor. For example, the host memory 120 may be or may include a dynamic random access memory (DRAM), and may have a form factor of a dual in-line memory module (DIMM).

Each of the plurality of DRAM-less storage devices 130_1 to 130_K includes a plurality of nonvolatile memories QLC NVM as a storage medium, and a DRAM is omitted in each of the plurality of DRAM-less storage devices 130_1 to 130_K as a buffer memory. Each of the plurality of DRAM-less storage devices 130_1 to 130_K may further include a storage controller STG CONT that controls an operation of a respective one of the plurality of DRAM-less storage devices 130_1 to 130_K. For example, the plurality of DRAM-less storage devices 130_1 to 130_K may include first to K-th DRAM-less storage devices 130_1 to 130_K. A configuration of each of the plurality of DRAM-less storage devices 130_1 to 130_K will be described with reference to FIGS. 8 through 11.

In some implementations, the plurality of nonvolatile memories QLC NVM may be quadruple-level cell (QLC) nonvolatile memories that include a plurality of QLCs each of which stores 4-bit data, and the plurality of DRAM-less storage devices 130_1 to 130_K may be QLC DRAM-less storage devices. Hereinafter, examples will be described based on the QLC nonvolatile memories and the QLC DRAM-less storage devices, but other examples are possible. For example, the plurality of nonvolatile memories included in the plurality of DRAM-less storage devices 130_1 to 130_K may include a plurality of memory cells each of which stores data having two or more bits. For example, each of the plurality of memory cells may be an arbitrary multi-bit cell that stores k-bit data and is programmed to have one of $2^k$ states, where k is a positive integer greater than or equal to two.

The at least one CXL memory expander 140 is electrically connected to the plurality of DRAM-less storage devices 130_1 to 130_K, communicates through a CXL interface, and operates as a buffer memory of the plurality of DRAM-less storage devices 130_1 to 130_K. For convenience of illustration, only one CXL memory expander 140 is illustrated in FIG. 1, however, the storage system 100 may include two or more CXL memory expanders. The CXL memory expander 140 may include a CXL controller CXL CONT that controls an operation of the CXL memory expander 140, and a plurality of volatile memories VM that store data. An operation of using the CXL memory expander 140 as the buffer memory of the plurality of DRAM-less storage devices 130_1 to 130_K will be described with reference to FIGS. 3A, 3B, and 4. A configuration of the CXL memory expander 140 will be described with reference to FIGS. 12 and 13.

The CXL memory expander 140 may operate under a control of the host device 110 and may store data. The CXL memory expander 140 may communicate with the host device 110 through an interface (e.g., an interface based on CXL protocol or a CXL interface) different from that of the host memory 120 (e.g., a DRAM), and may be electrically connected to the host device 110 without adding memory channels to the host device 110. Thus, the CXL memory expander 140 may be additionally installed in the storage system 100 regardless of existing or conventional memory technologies, and the memory capacity and the memory bandwidth of the storage system 100 may efficiently increase.

The CXL protocol is an open standard for high-speed CPU-to-device and CPU-to-memory connections, designed for, for example, high performance data center computers. The CXL protocol may be built on, for example, a peripheral component interconnect express (PCIe) to form a physical and electrical interface in several areas such as input/output (I/O), memory, and cache. The CXL protocol may maintain memory coherency between a CPU memory (e.g., the host memory 120) directly attached to the CPU and the memory on a CXL device (e.g., the CXL memory expander 140). For example, the CPU and the CXL device may access (e.g., read, write, and/or transfer) the same data seamlessly. For example, when the CXL protocol is applied or employed, the CPU may use both the CPU memory and the CXL device as a buffer memory. In other words, the CXL protocol and/or interface may represent low latency and high bandwidth links that support dynamic protocol muxing and enable a variety of connections between various devices.

Although examples are described based on the CXL memory expander 140 implemented based on the CXL protocol, other examples are possible. For example, the CXL memory expander 140 may be implemented based on at least one of various protocols, such as a Gen-Z protocol, an NVLink protocol, a cache coherent interconnect for accelerators (CCIX) protocol, an open coherent accelerator processor interface (CAPI) protocol, etc.

In some implementations, the plurality of DRAM-less storage devices 130_1 to 130_K and the CXL memory expander 140 may have the same form factor. For example, the plurality of DRAM-less storage devices 130_1 to 130_K and the CXL memory expander 140 may have a second form factor different from the first form factor. The form factors of the plurality of DRAM-less storage devices 130_1 to 130_K and the CXL memory expander 140 will be described with reference to FIGS. 6, 7A and 7B.

The host device 110, the plurality of DRAM-less storage devices 130_1 to 130_K, and the CXL memory expander 140 may be connected to each other and may communicate with each other through the bus 115. For example, the host device 110 and the plurality of DRAM-less storage devices 130_1 to 130_K may communicate through an interface such as peripheral component interconnect express (PCIe), nonvolatile memory express (NVMe), etc., the host device 110 and the CXL memory expander 140 may communicate through an interface such as CXL, and the bus 115 may be implemented to support the different interfaces (e.g., heterogeneous interfaces). However, the present disclosure is not limited thereto. For another example, the host device 110, the plurality of DRAM-less storage devices 130_1 to 130_K, and the CXL memory expander 140 may communicate through the same or similar interfaces, and the bus 115 may be implemented to support the same or similar interfaces (e.g., homogeneous interfaces).

The PLP capacitor 150 is electrically connected to the plurality of DRAM-less storage devices 130_1 to 130_K and the CXL memory expander 140, is disposed outside the plurality of DRAM-less storage devices 130_1 to 130_K, and supplies an auxiliary power voltage to the plurality of DRAM-less storage devices 130_1 to 130_K and the CXL memory expander 140 in a sudden power off (SPO) condition (or situation) in which an external power voltage is suddenly, e.g., accidently, turned off. The PLP capacitor 150 may be referred to as an auxiliary (or secondary) power supply device, a PLP integrated circuit (IC), etc. An operation using the PLP capacitor 150 will be described with reference to FIGS. 5A and 5B.

Storage systems and/or server systems that include a plurality of DRAM-less storage devices have been studied for high capacity and low cost. Since the DRAM-less storage device does not include a DRAM as a buffer memory and a PLP capacitor to supply an auxiliary power voltage in a SPO condition to reduce manufacturing costs, there are problems in that performance may be degraded due to the absence of the buffer memory and data may be lost in the SPO condition due to the absence of the PLP capacitor. Further, since the DRAM-less storage device includes nonvolatile memories having multi-bit memory cells as storage media to reduce manufacturing costs, there is a problem since a possibility of data integrity being damaged is relatively high.

The storage system 100 may include the at least one CXL memory expander 140 that operates as a buffer memory of the plurality of DRAM-less storage devices 130_1 to 130_K, and may include the PLP capacitor 150 that is disposed outside the plurality of DRAM-less storage devices 130_1 to 130_K. Even if the storage capacity of the plurality of DRAM-less storage devices 130_1 to 130_K increases, mapping data, write operations, etc. may be managed normally and/or stably by the CXL memory expander 140. Even in the SPO condition, the data loss may be prevented using the auxiliary power voltage supplied from the PLP capacitor 150. In addition, as will be described with reference to FIGS. 14, 16, and 19, an erasure code function and an end-to-end data protection function may be performed by an accelerator and/or a computational storage device that are separately formed, or the plurality of DRAM-less storage devices 130_1 to 130_K may perform an enhanced error correction code (ECC) function by itself, and thus the data integrity may be maintained. Accordingly, the storage system 100 may have improved or enhanced performance with relatively large storage capacity and low manufacturing cost.

FIGS. 2, 3A, 3B, 4, 5A and 5B are diagrams for describing an example of an operation of a storage system.

Figure 2:
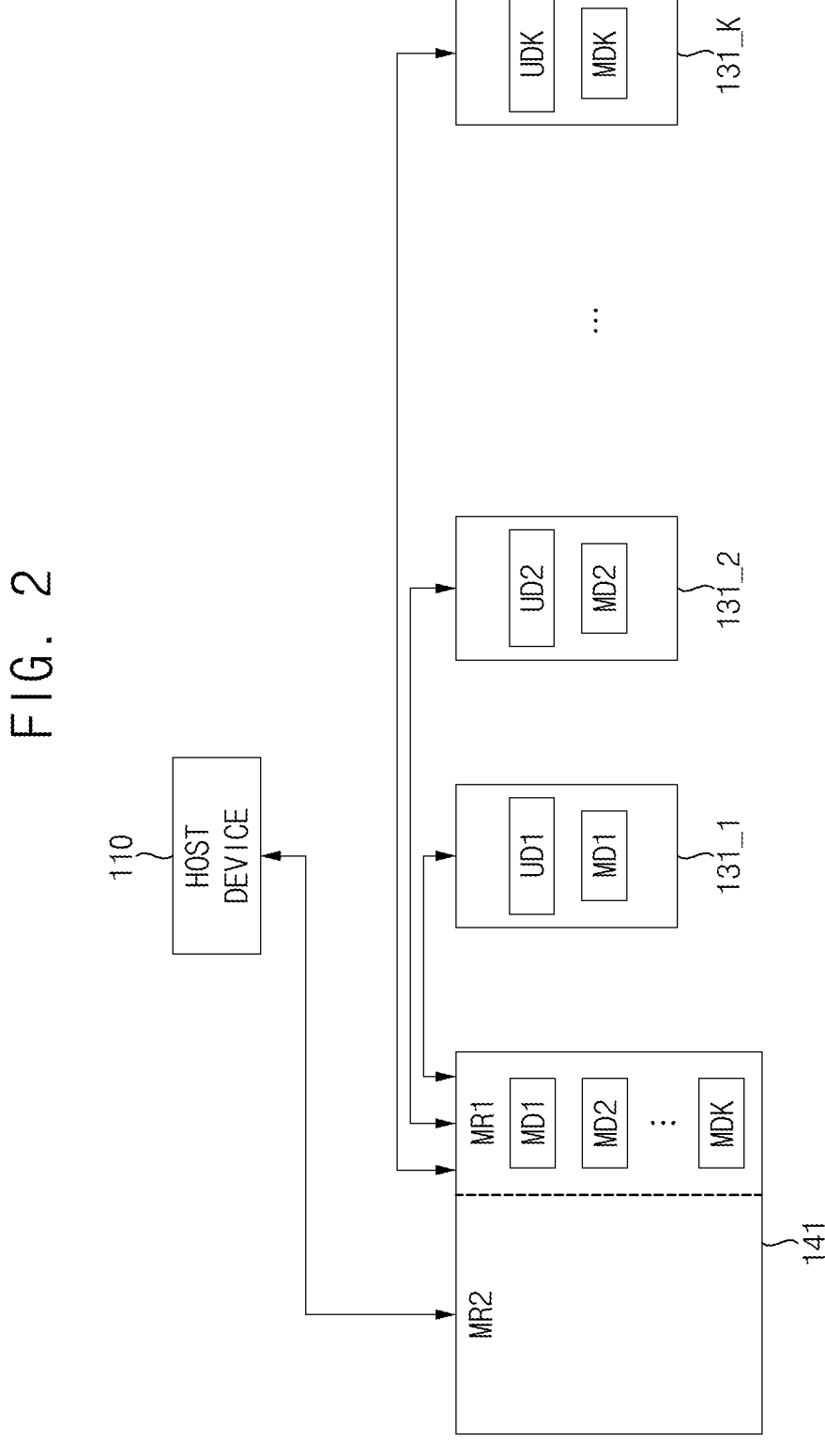

Referring to FIG. 2, an example of memory regions (or areas) included in the CXL memory expander 140 in FIG. 1 is illustrated. For convenience of illustration, only one volatile memory 141 included in the CXL memory expander 140, one first nonvolatile memory 131_1 included in the first DRAM-less storage device 130_1, one second nonvolatile memory 131_2 included in the second DRAM-less storage device 130_2, and one K-th nonvolatile memory 131_K included in the K-th DRAM-less storage device (130_K) are illustrated.

The first DRAM-less storage device 130_1 may store first user data UD1 and first mapping data MD1 corresponding to the first user data UD1 in the first nonvolatile memory 131_1. The second DRAM-less storage device 130_2 may store second user data UD2 and second mapping data MD2 corresponding to the second user data UD2 in the second nonvolatile memory 131_2. The K-th DRAM-less storage device 130_K may store K-th user data UDK and K-th mapping data MDK corresponding to the K-th user data UDK in the K-th nonvolatile memory 131_K. The mapping data may include information associated with or related to mapping relationship (or correspondence) between logical addresses managed by the host device 110 and physical addresses of the nonvolatile memory, and data stored in the nonvolatile memory may be managed using the mapping data. For example, the first mapping data MD1 may include a relationship between logical addresses and physical addresses for the first user data UD1.

The CXL memory expander 140 may include, in the volatile memory 141, a first memory region MR1 and a second memory region MR2 that are different from each other. For example, the first and second memory regions MR1 and MR2 may be set by the host device 110 and may be set in an initial operation time or at the beginning of an operation of the storage system 100 (e.g., after power voltage is supplied to storage system 100).

The first memory region MR1 may be allocated as a dedicated area for the plurality of DRAM-less storage devices 130_1 to 130_K, e.g., for the plurality of nonvolatile memories 131_1 to 131_K. For example, the first memory region MR1 may be accessed by the plurality of DRAM-less storage devices 130_1 to 130_K, and may store the plurality of mapping data MD1 to MDK of the plurality of DRAM-less storage devices 130_1 to 130_K.

As described above, since each of the plurality of DRAM-less storage devices 130_1 to 130_K does not include a DRAM as a buffer memory, a buffer region may be required to store the mapping data MD1 to MDK, and the first memory region MR1 may be used as a buffer memory for the plurality of DRAM-less storage devices 130_1 to 130_K.

Among regions of the volatile memory 141, the remaining region that are not allocated as a dedicated area for the plurality of DRAM-less storage devices 130_1 to 130_K, e.g., the second memory region MR2 may be an area accessible by the host device 110 and/or an area managed by the host device 110. For example, the second memory region MR2 may be used in a similar role to the host memory 120, e.g., as an extended main memory or an extended system memory of the storage system 100.

Figure 3A:
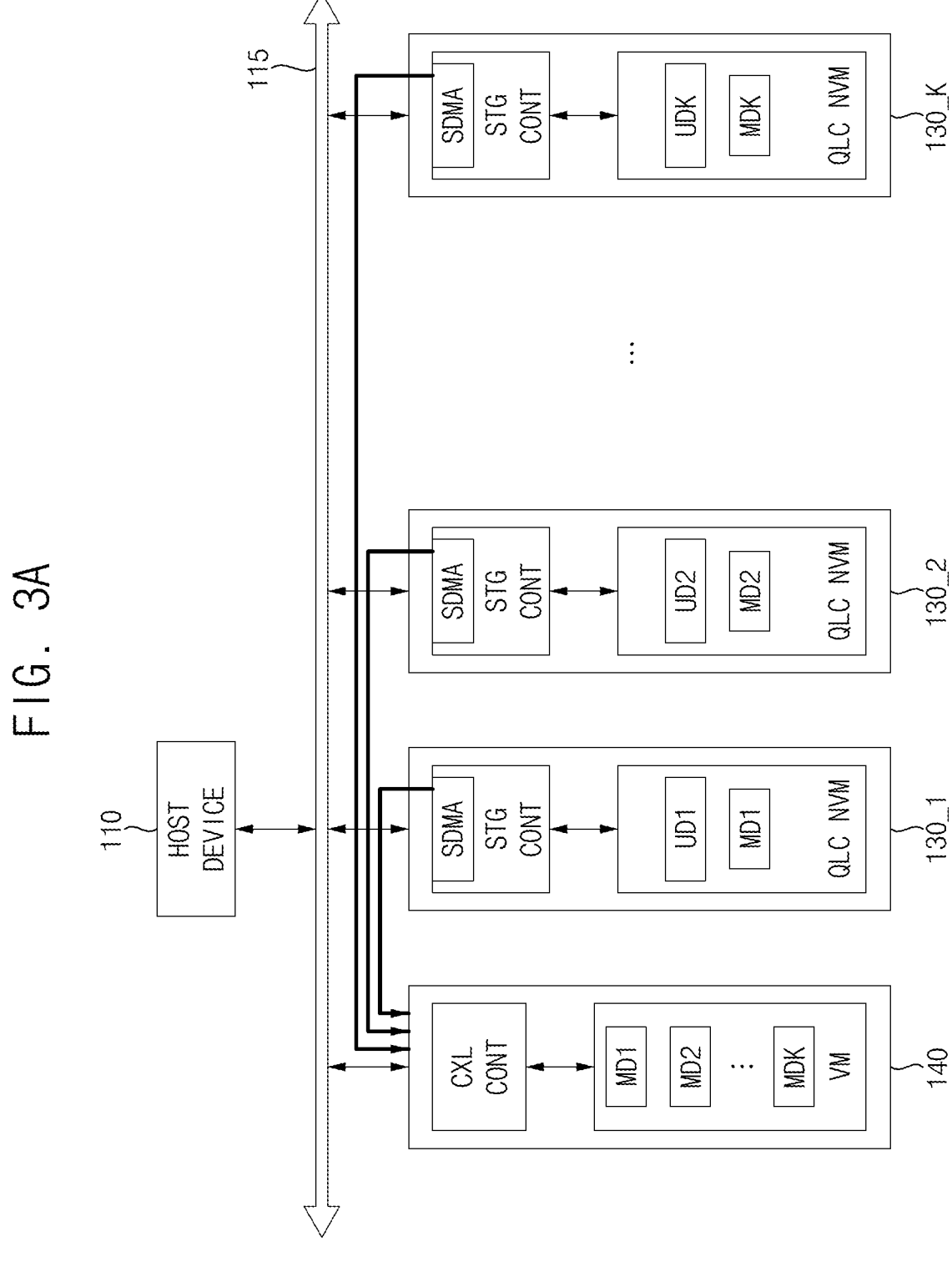
Figure 3B:
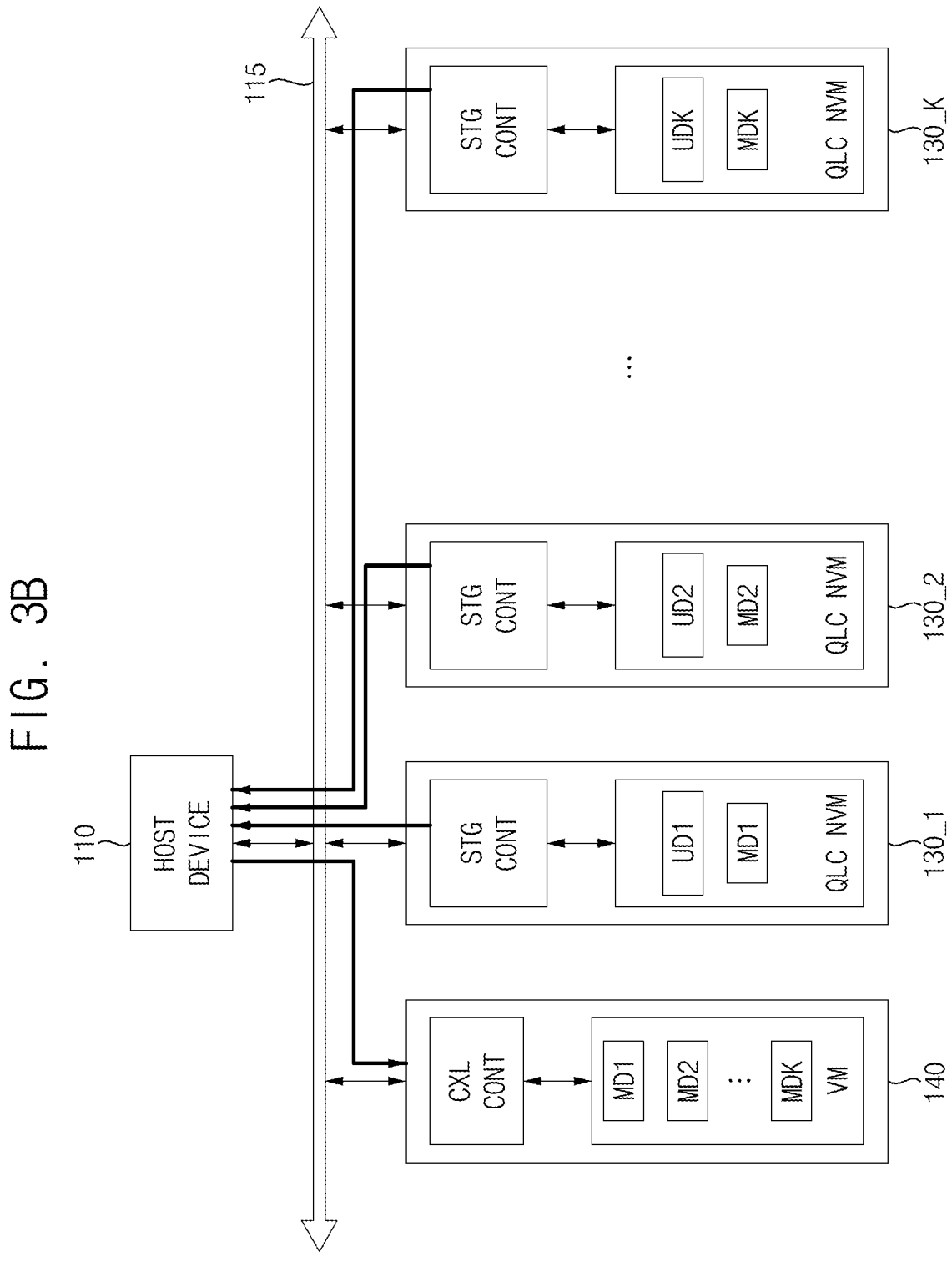

Referring to FIGS. 3A and 3B, an example of an operation in which the plurality of mapping data MD1 to MDK in FIG. 2 are stored in the CXL memory expander 140 (e.g., in the first memory region MR1) is illustrated. For convenience of illustration, components that are irrelevant to the operation of storing the mapping data MD1 to MDK are omitted.

In some implementations, as illustrated in FIG. 3A, the plurality of DRAM-less storage devices 130_1 to 130_K and the CXL memory expander 140 may exchange the mapping data MD1 to MDK based on a peer-to-peer (P2P) scheme. For example, the storage controller STG CONT included in each of the plurality of DRAM-less storage devices 130_1 to 130_K may include a direct memory access (DMA) engine SDMA. The DMA engine SDMA included in the storage controller STG CONT may transmit the mapping data MD1 to MDK stored in the nonvolatile memories QLC NVM to the CXL memory expander 140 without intervention and/or control of the host device 110. In other words, the mapping data MD1 to MDK may be transmitted from the plurality of DRAM-less storage devices 130_1 to 130_K to the CXL memory expander 140 based on the P2P scheme and may be stored in the volatile memory VM (e.g., in the first memory region MR1).

In some implementations, as illustrated in FIG. 3B, the plurality of DRAM-less storage devices 130_1 to 130_K and the CXL memory expander 140 may exchange the mapping data MD1 to MDK based on a DMA scheme under a control of the host device 110. For example, the host device 110 may include a DMA engine HDMA. The DMA engine HDMA of the host device 110 may read the mapping data MD1 to MDK from the plurality of DRAM-less storage devices 130_1 to 130_K and may transmit the read mapping data MD1 to MDK to the CXL memory expander 140.

In some implementations, the above-described mapping data transfer operation from the plurality of DRAM-less storage devices 130_1 to 130_K to the CXL memory expander 140 may be performed in the initial operation time or at the beginning of the operation of the storage system 100.

In some implementations, a mapping data transfer operation (e.g., mapping data backup or flush operation) from the CXL memory expander 140 to the plurality of DRAM-less storage devices 130_1 to 130_K may also be implemented in a manner similar to that described above. For example, the mapping data transfer operation from the CXL memory expander 140 to the plurality of DRAM-less storage devices 130_1 to 130_K may be performed periodically and/or based on a request while the storage system 100 is operating or driving.

In the storage system 100, each of the plurality of DRAM-less storage devices 130_1 to 130_K may not include a DRAM as a buffer memory to reduce manufacturing costs, and a portion (e.g., the first memory region MR1) in the CXL memory expander 140 located outside the plurality of DRAM-less storage devices 130_1 to 130_K may be used as the buffer memory. The CXL memory expander 140 may be formed separately from the DRAM-less storage devices 130_1 to 130_K, and thus may be implemented with relatively large capacity. Accordingly, even if the size of the mapping data MD1 to MDK increases as the storage capacity of the DRAM-less storage devices 130_1 to 130_K increases, the mapping data MD1 to MDK may be managed normally and/or efficiently by the CXL memory expander 140.

Figure 4:
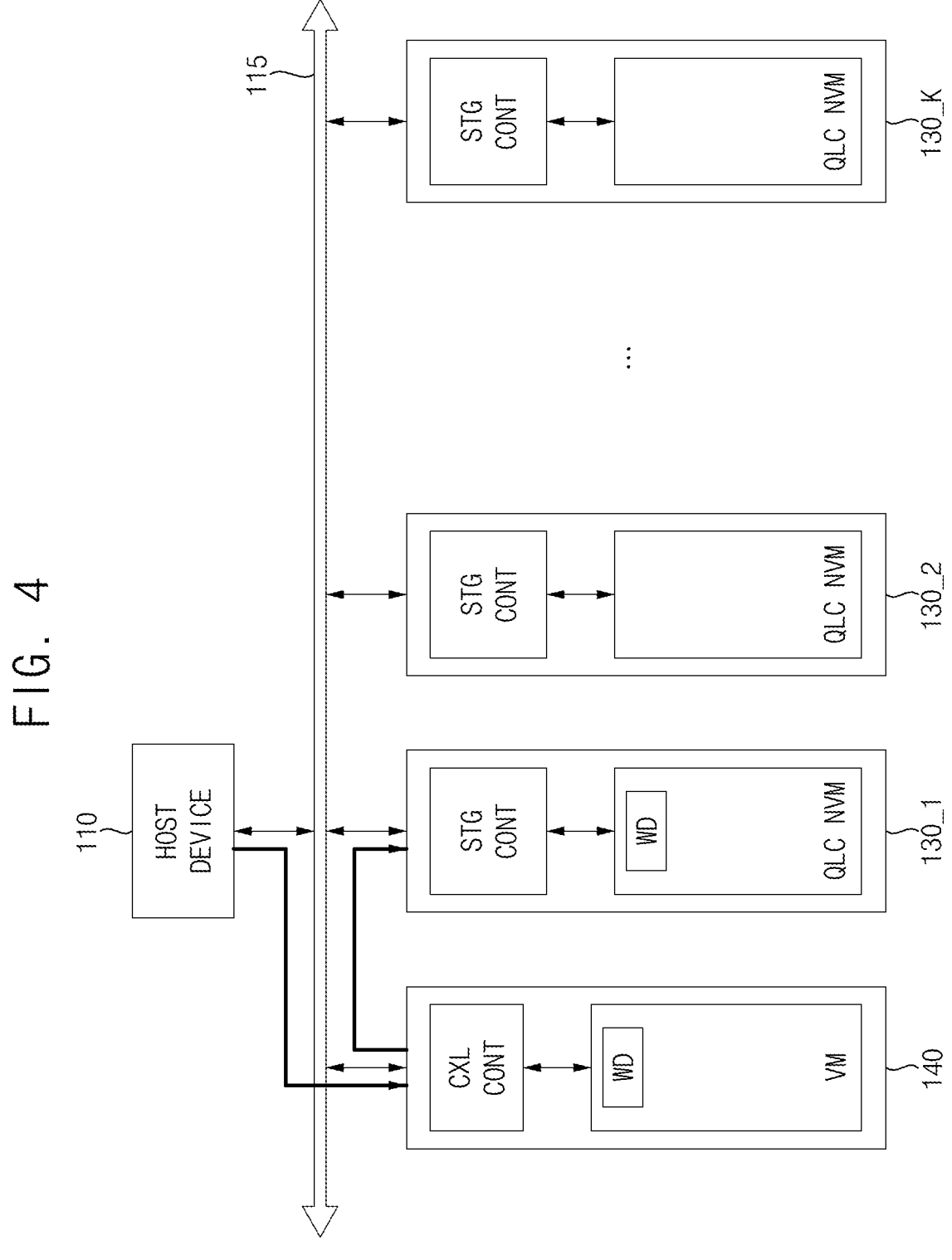

Referring to FIG. 4, an example of a write operation on the plurality of DRAM-less storage devices 130_1 to 130_K in FIG. 1 is illustrated. For convenience of illustration, components that are irrelevant to the write operation are omitted.

When write data WD is to be stored or programmed into the first DRAM-less storage device 130_1 among the plurality of DRAM-less storage devices 130_1 to 130_K, the host device 110 may transmit the write data WD to the CXL memory expander 140, and the write data WD may be temporarily stored in the volatile memory VM of the CXL memory expander 140 (e.g., in the first memory region MR1). Thereafter, the write data WD may be stored into the nonvolatile memory QLC NVM included in the first DRAM-less storage device 130_1 using the write data WD temporarily stored in the CXL memory expander 140, and thus the write operation may be completed.

As described above, since each of the plurality of DRAM-less storage devices 130_1 to 130_K does not include a DRAM as a buffer memory, a buffer region may be required to temporarily store the write data WD, and the volatile memory VM (e.g., the first memory region MR1) of the CXL memory expander 140 may be used as a buffer memory for the plurality of DRAM-less storage devices 130_1 to 130_K. For example, the write operation to store the write data WD may be performed similarly to an on-chip buffered program (OBP) scheme.

The DRAM-less storage device does not include a DRAM as a buffer memory to reduce manufacturing costs. In a conventional DRAM-less storage device, the write operation is performed using a host memory buffer (HMB) scheme using the host memory as a buffer memory. As a result, there is a problem in that the performance of the host device is degraded due to excessive use of the host memory.

In the storage system 100, a portion of the CXL memory expander 140, which is located outside the plurality of DRAM-less storage devices 130_1 to 130_K and is formed separately from the host memory 120, may be used as a buffer memory. Accordingly, the write operation may be efficiently performed without the performance degradation (or deterioration) of the host device 110.

The data transfer operations described with reference to FIGS. 3A, 3B, and 4 are merely exemplary, and the present disclosure is not limited thereto.

Figure 5A:
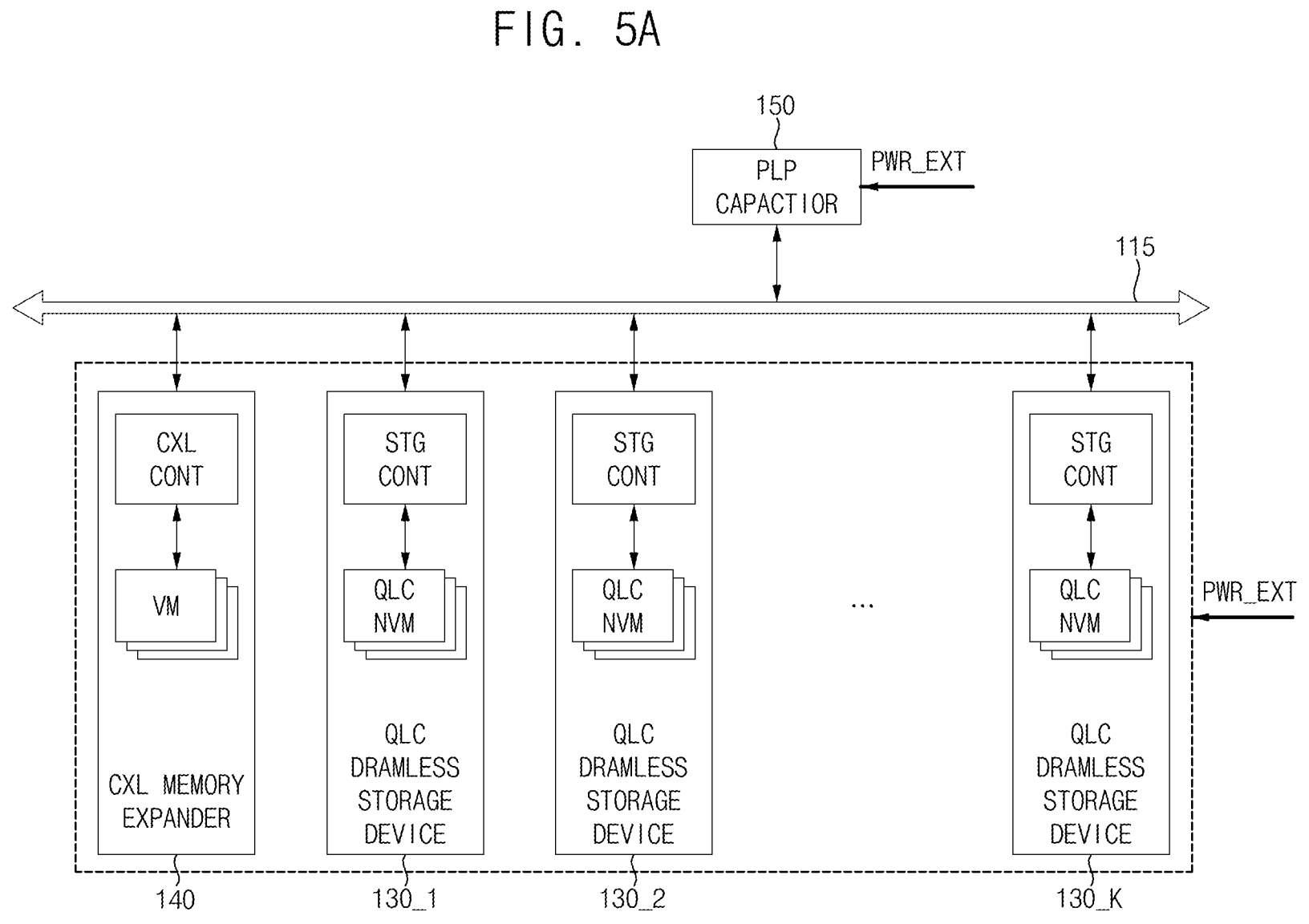
Figure 5B:
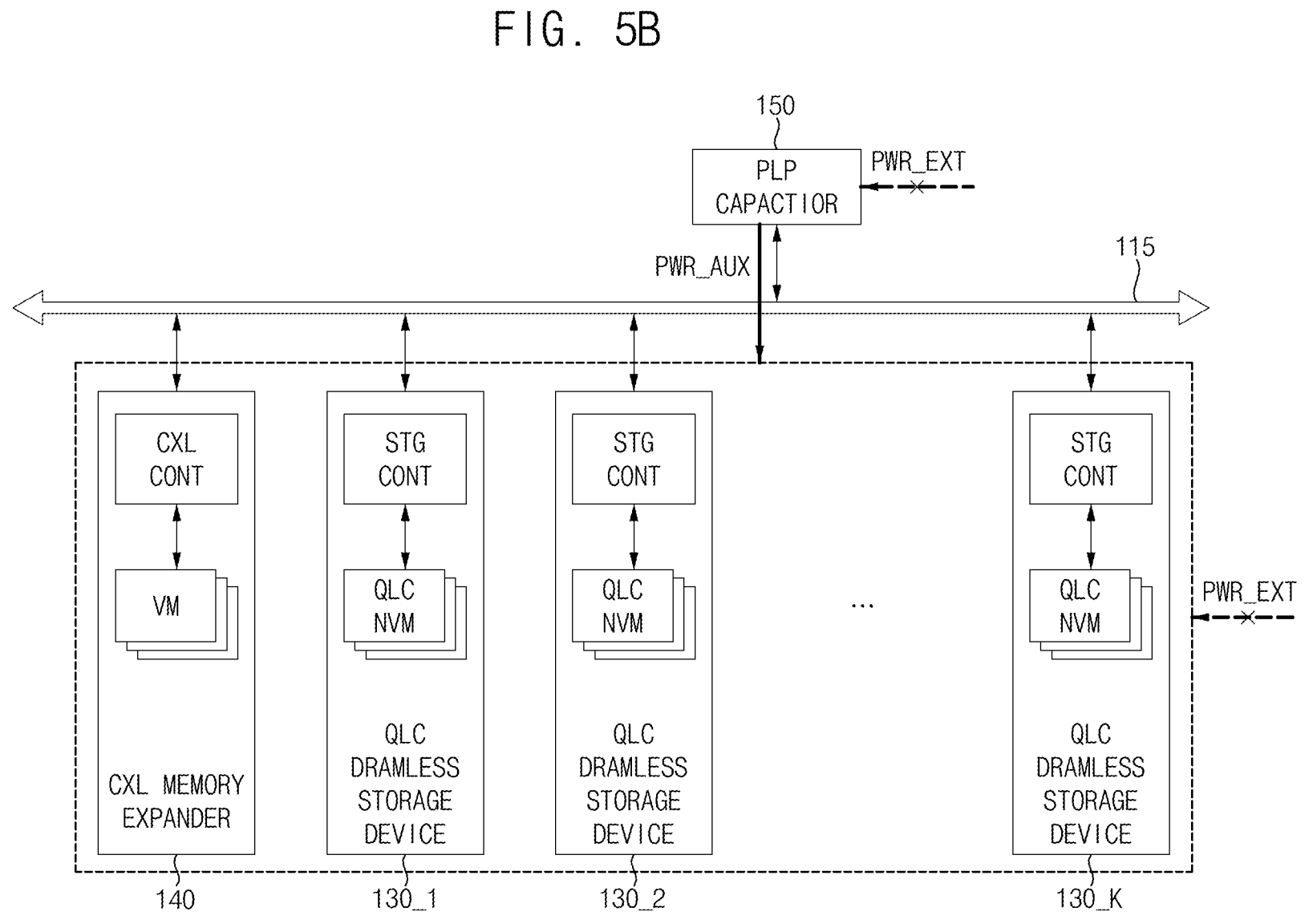

Referring to FIGS. 5A and 5B, an example of an operation of supplying an auxiliary power voltage PWR_AUX using the PLP capacitor 150 in FIG. 1 is illustrated. For convenience of illustration, components that are irrelevant to the supply of the auxiliary power voltage PWR_AUX are omitted.

As illustrated in FIG. 5A, when an external power voltage PWR_EXT is normally supplied, the plurality of DRAM-less storage devices 130_1 to 130_K and the CXL memory expander 140 may operate based on the external power voltage PWR_EXT, and the PLP capacitor 150 may be charged based on the external power voltage PWR_EXT. For example, operating voltages generated based on the external power voltage PWR_EXT may be supplied to the storage controllers STG CONT, the nonvolatile memories QLC NVM, the CXL controller CXL CONT and the volatile memories VM.

As illustrated in FIG. 5B, when the supply of the external power voltage VEXT is blocked, cut off or stopped (e.g., when the SPO situation occurs), the PLP capacitor 150 may generate the auxiliary power voltage PWR_AUX, and the plurality of DRAM-less storage devices 130_1 to 130_K and the CXL memory expander 140 may operate based on the auxiliary power voltage PWR_AUX. For example, operating voltages generated based on the auxiliary power voltage PWR_AUX may be supplied to the storage controllers STG CONT, the nonvolatile memories QLC NVM, the CXL controller CXL CONT and the volatile memories VM.

In some implementations, even if the supply of the external power voltage VEXT is blocked, a PLP operation or a PLP dump operation in which normally terminates the operation of the storage system 100 may be performed based on the auxiliary power voltage PWR_AUX for a predetermined time interval. For example, the auxiliary power voltage PWR_AUX may be generated by charges in the PLP capacitor 150 stored based on the external power voltage PWR_EXT, the supply of the auxiliary power voltage PWR_AUX may also be blocked when a certain period of time elapses after the supply of the external power voltage VEXT is blocked, and thus a reset operation and/or a flush operation may be performed based on the auxiliary power voltage PWR_AUX before the supply of the auxiliary power voltage PWR_AUX is blocked. For example, as will be described with reference to FIGS. 15, 18, and 22, data stored in the CXL memory expander 140 may be moved to another storage space.

The DRAM-less storage device does not include a PLP capacitor to supply an auxiliary power voltage in a SPO condition to reduce manufacturing costs. In this case, there is a problem in that the data loss occurs in the SPO condition.

In the storage system 100, the PLP capacitor 150 may be formed outside the plurality of DRAM-less storage devices 130_1 to 130_K. Accordingly, the data loss may be prevented using the auxiliary power voltage PWR_AUX supplied from the PLP capacitor 150 in the SPO condition.

Figure 6:
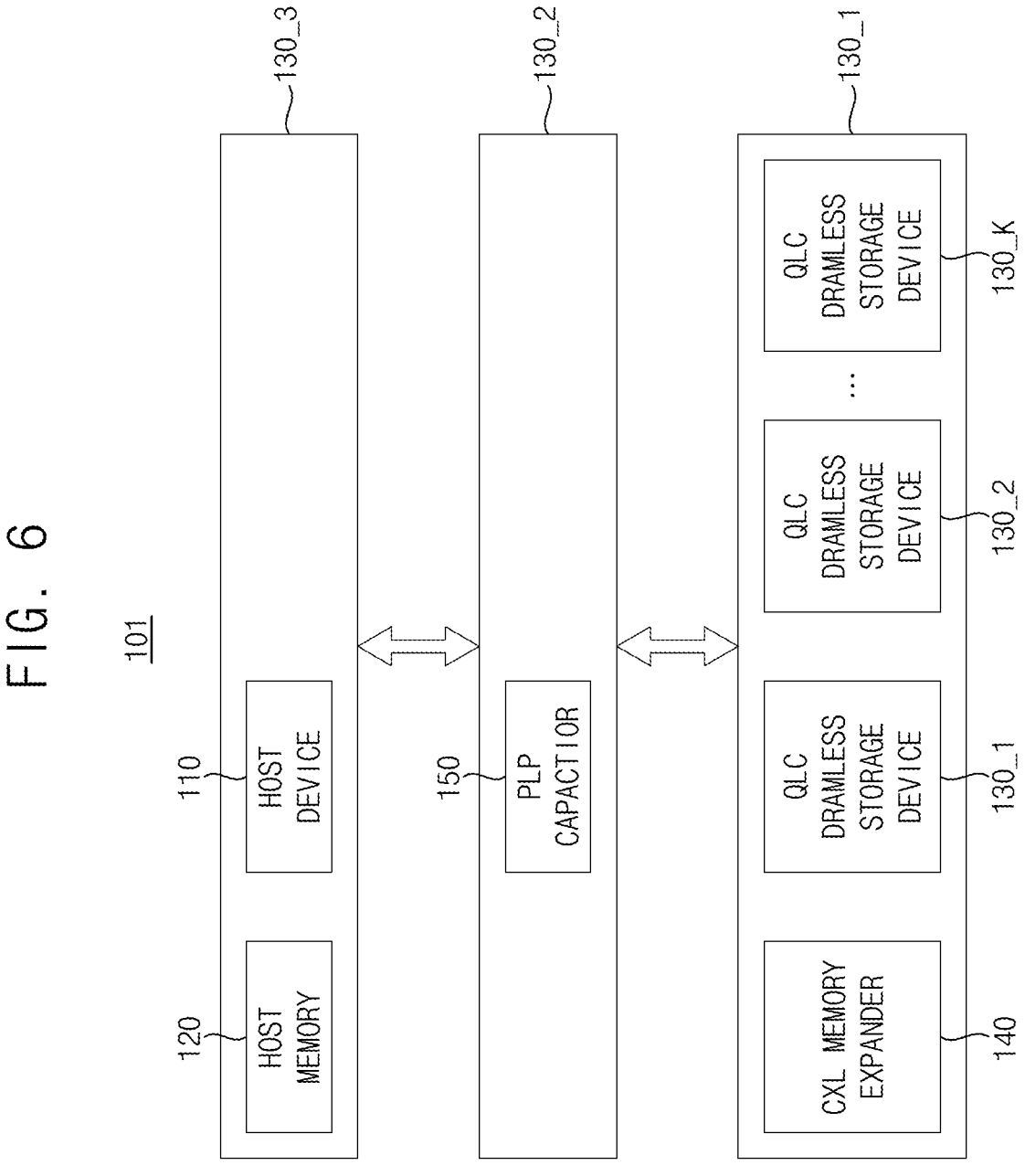
FIG. 6 is a block diagram illustrating an example of a storage system.

FIG. 6 is a block diagram illustrating an example of a storage system. The descriptions repeated with FIG. 1 will be omitted.

Referring to FIG. 6, a storage system 101 includes a host device 110, a host memory 120, a plurality of DRAM-less storage devices 130_1 to 130_K, at least one CXL memory expander 140, and a PLP capacitor 150. The storage system 101 may further include a first substrate 103_1, a second substrate 103_2, and a third substrate 103_3. For convenience of illustration, a component corresponding to the bus 115 in FIG. 1 is omitted, and detailed configurations of the DRAM-less storage devices 130_1 to 130_K and the CXL memory expander 140 are omitted.

The DRAM-less storage devices 130_1 to 130_K and the CXL memory expander 140 may be mounted on the first substrate 103_1. The PLP capacitor 150 may be mounted on the second substrate 103_2 that is formed separately from the first substrate 103_1. The host device 110 and the host memory 120 may be mounted on the third substrate 103_3 that is formed separately from the first and second substrates 103_1 and 103_2. For example, each of the first to third substrates 103_1 to 103_3 may be a printed circuit board (PCB). The first substrate 103_1 may be referred to as a storage substrate or a memory substrate, the second substrate 103_2 may be referred to as a backplane, and the third substrate 103_3 may be referred to as a motherboard.

A backplane or backplane system is a group of electrical connectors in parallel with each other, so that each pin of each connector is linked to the same relative pin of all the other connectors, forming a computer bus. The backplane is used to connect several printed circuit boards together to make up a complete computer system. The backplane is generally differentiated from a motherboard by the lack of on-board processing and storage elements.

In the storage system 101, the PLP capacitor 150 may be mounted on the second substrate 103_2 (e.g., backplane), which is different from the first substrate 103_1 on which the DRAM-less storage devices 130_1 to 130_K and the CXL memory expander 140 are mounted. Therefore, the PLP capacitor 150 may be installed without reducing a space where the DRAM-less storage devices 130_1 to 130_K and the CXL memory expander 140 are installed.

Figure 7A:
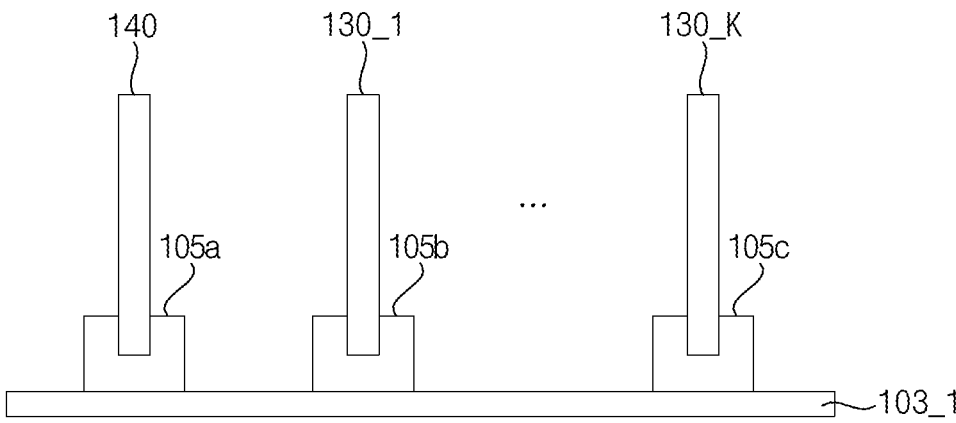
FIGS. 7A and 7B are diagrams for describing an example of a DRAM-less storage device and a CXL memory expander included in the storage system of FIG. 6.
Figure 7B:
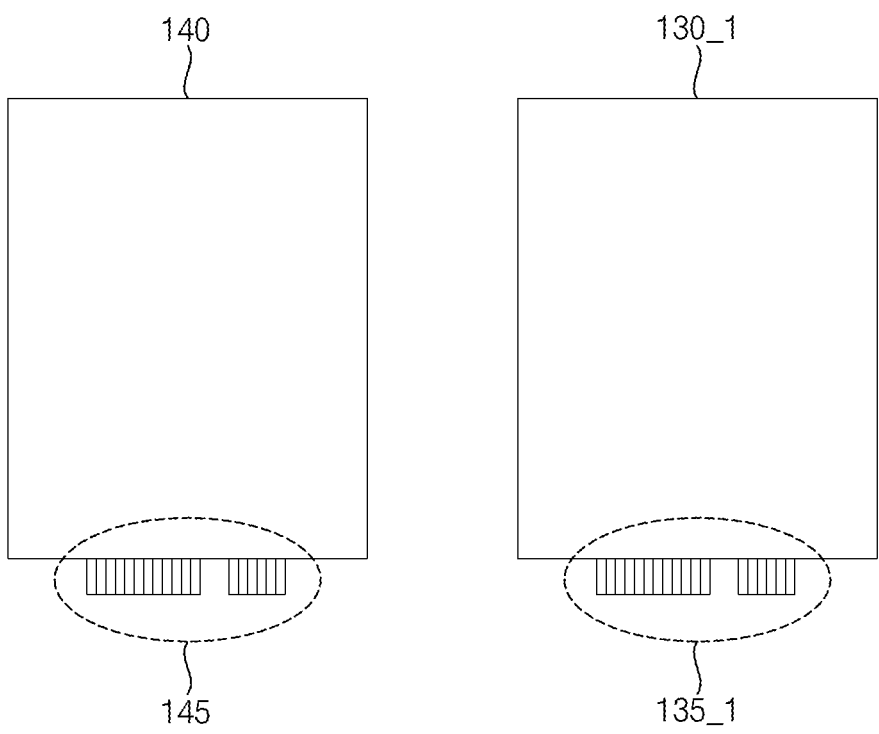

FIGS. 7A and 7B are diagrams for describing an example of a DRAM-less storage device and a CXL memory expander included in the storage system of FIG. 6.

Referring to FIG. 7A, a plurality of slots 105a, 105b, . . . , 105c (or any other suitable structures such as sockets) are formed on the first substrate 103_1.

The DRAM-less storage devices 130_1 to 130_K and the CXL memory expander 140 may be electrically attachable to and detachable from the first substrate 103_1 using the plurality of slots 105a to 105c into which the DRAM-less storage devices 130_1 to 130_K and the CXL memory expander 140 are connected (e.g., inserted). For example, the CXL memory expander 140 may be inserted into the slot 105a and electrically attached to the first substrate 103_1 and the storage system 101 and may be removed from the slot 105a and electrically detached from the first substrate 103_1 and the storage system 101. Similarly, the DRAM-less storage device 130_1 may be inserted into and removed from the slot 105b, and the DRAM-less storage device 130_K may be inserted into and removed from the slot 105c.

Referring to FIG. 7B, the plurality of DRAM-less storage devices 130_1 to 130_K and the CXL memory expander 140 may have the same form factor.

For example, a structure or configuration (e.g., number, arrangement, shape, etc.) of a plurality of connectors and/or pins 135_1 of the first DRAM-less storage device 130_1 may be substantially the same as that of a plurality of connectors and/or pins 145 of the CXL memory expander 140. Although not illustrated in FIG. 7B, each of the remaining DRAM-less storage devices 130_2 to 130_K may also have the same form factor.

In some implementations, the plurality of DRAM-less storage devices 130_1 to 130_K and the CXL memory expander 140 may be implemented based on enterprise and data center standard form factor (EDSFF). For example, the plurality of DRAM-less storage devices 130_1 to 130_K and the CXL memory expander 140 may be implemented based on one of E1.S, E1.L, E3.S, and E3.L form factors. As another example, the plurality of DRAM-less storage devices 130_1 to 130_K and the CXL memory expander 140 may be implemented based on one of M.2 form factor, U.2 form factor, various other PCIe-based form factors, and/or various other small form factors. Alternatively, the plurality of DRAM-less storage devices 130_1 to 130_K and the CXL memory expander 140 may be implemented based on one of other various form factors and may support a hot-plug function that can be mounted on or removed from physical ports (e.g., the slots 105a to 105c).

In the storage system 101, the DRAM-less storage devices 130_1 to 130_K and the CXL memory expander 140 may have the same form factor, and thus the number of the DRAM-less storage devices 130_1 to 130_K and the number of the CXL memory expander 140 may be freely and variously determined in the storage system 101. For example, in the storage system 101 including one CXL memory expander 140 and K DRAM-less storage devices 130_1 to 130_K as illustrated in FIGS. 6 and 7A, when the DRAM-less storage device 130_1 is removed from the slot 105b and another CXL memory expander is inserted into the slot 105b, the storage system including two CXL memory expanders and (K−1) DRAM-less storage devices may be easily implemented.

FIGS. 8, 9, 10 and 11 are diagrams illustrating an example of a DRAM-less storage device and a nonvolatile memory included in a storage system.

Figure 8:
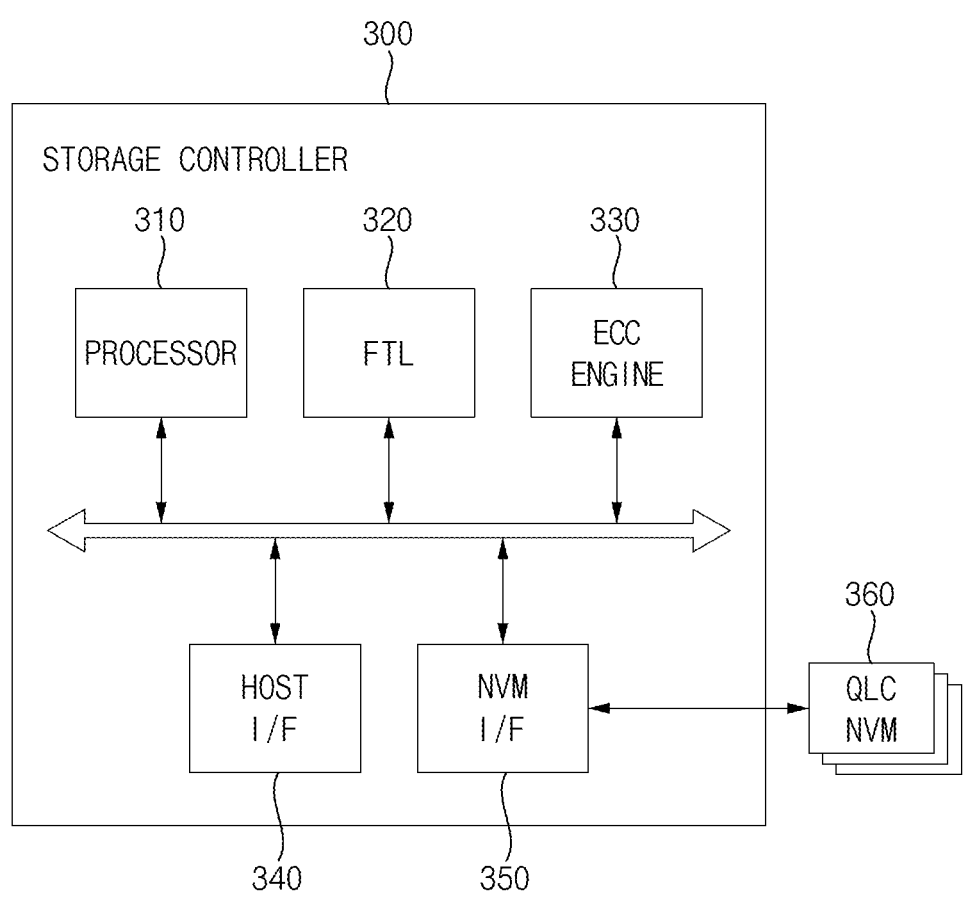

Referring to FIG. 8, a DRAM-less storage device (e.g., the DRAM-less storage device 130_1 in FIG. 1) may include a storage controller 300 and a plurality of nonvolatile memories 360. The storage controller 300 may include a processor 310, a flash translation layer (FTL) 320, an ECC engine 330, a host interface (I/F) 340, and a nonvolatile memory interface 350. Although not illustrated in FIG. 8, the storage controller 300 may further include an advanced encryption standard (AES) engine that performs encryption/ decryption operations.

The processor 310 may control an operation of the storage controller 300 in response to a request or command received via the host interface 340 from a host device (e.g., the host device 110 in FIG. 1). For example, the processor 310 may control an operation of the DRAM-less storage device and may control respective components by employing firmware (FW) for operating the DRAM-less storage device.

The FTL 320 may perform various functions, such as, for example, an address mapping operation, a wear-leveling operation, a garbage collection operation, etc. The address mapping operation may be an operation of converting a logical address received from the host device into a physical address used to store data in the nonvolatile memories 360. The wear-leveling operation may be a technique for preventing excessive deterioration of a specific block by allowing blocks of the nonvolatile memories 360 to be uniformly used. As an example, the wear-leveling operation may be implemented using a FW technique that balances erase counts of physical blocks. The garbage collection operation may be a technique for ensuring usable capacity in the nonvolatile memories 360 by erasing an existing block after copying valid data of the existing block to a new block.

The ECC engine 330 for error correction may perform coded modulation using, for example, a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 340 may provide physical connections between the host device and the DRAM-less storage device. The host interface 340 may provide an interface corresponding to a bus format of the host device for communication between the host device and the DRAM-less storage device.

The nonvolatile memory interface 350 may exchange data with the nonvolatile memories 360. The nonvolatile memory interface 350 may transfer data to the nonvolatile memories 360 or may receive data read from the nonvolatile memories 360. For example, the nonvolatile memory interface 350 may be configured to comply with a standard protocol, such as, for example, Toggle or open NAND flash interface (ONFI).

Referring to FIG. 9, an example of a software hierarchical structure of a host OS 410 executed by a host device (e.g., the host device 110 in FIG. 1) and a storage FW 430 executed by a DRAM-less storage device (e.g., the DRAM-less storage device 130_1 in FIG. 1) is illustrated.

The host OS 410 includes an application 421, a file system 422, a block layer 423 and a device driver 424. The storage FW 430 includes a host interface layer (HIL) 441, an FTL 442, a device manager 443 (or nonvolatile memory manager), and a low level driver 444.

The application 421 may be an application software program that is executed on the host OS 410. For example, the application 421 has been programmed to aid in generating, copying and deleting a file.

The file system 422 may manage files used by the host OS 410. For example, the file system 422 may manage file names, extensions, file attributes, file sizes, cluster information, etc. of files accessed by requests from the host OS 410 or applications executed by the host OS 410. The file system 422 may generate, delete and manage data on a file basis.

The block layer 423 may be referred to as a block input/output (I/O) layer and may perform data read/write operations by units of a memory block.

The device driver 424 may control the DRAM-less storage device at the OS level. The device driver 424 may be, for example, a software module of a kernel for controlling the DRAM-less storage device. The host OS 410 or the applications executed by the host OS 410 may request the data read/write operations via the device driver 424.

The HIL 441 may process or handle I/O requests from the host OS 410. For example, the HIL 441 may include an I/O stream manager.

The FTL 442 may be substantially the same as the FTL 320 in FIG. 8 and may perform several operations and/or functions such as a data placement operation DP (e.g., address mapping), a garbage collection operation GC, and a wear-leveling operation WEL.

The device manager 443 may perform several operations and/or functions such as a meta data management operation MM, a bad block management operation BBM, and a page access scheduling operation PAS.

The low level driver 444 may perform I/O operations with a nonvolatile memory (e.g., the nonvolatile memories 360 in FIG. 8).

Figure 10:
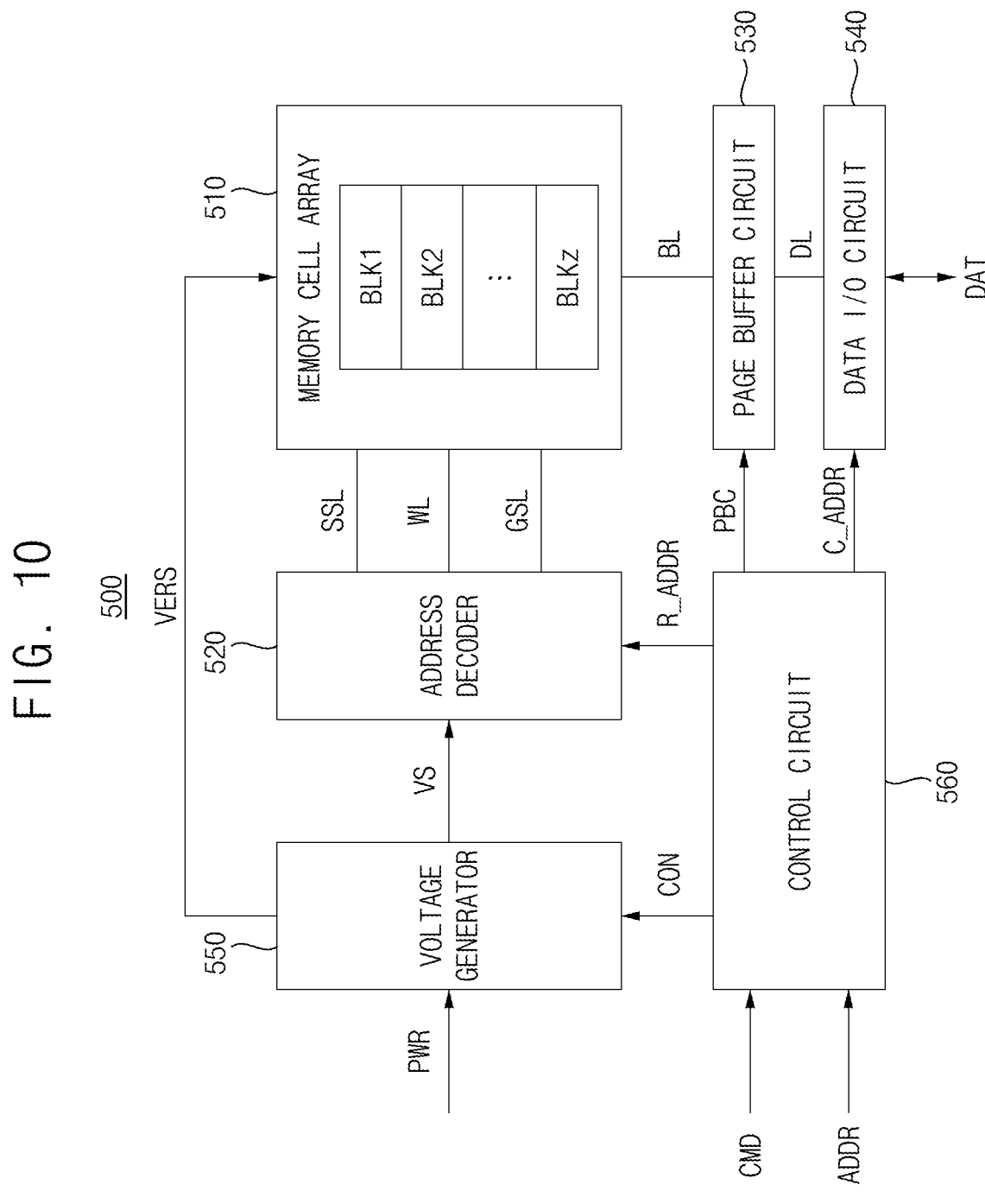

Referring to FIG. 10, a nonvolatile memory 500 includes a memory cell array 510, an address decoder 520, a page buffer circuit 530, a data input/output (I/O) circuit 540, a voltage generator 550 and a control circuit 560.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz, each of which includes memory cells, where z is a positive integer. In addition, each of the plurality of memory blocks BLK1 to BLKz may be divided into a plurality of pages.

In some implementations, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 may receive a command CMD and an address ADDR from outside of the nonvolatile memory 500 (e.g., from the storage controller 300 in FIG. 8), and may control erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL. For example, in the data erase/write/read operations, the address decoder 520 may determine at least one worldline of the plurality of wordlines WL as a selected wordline, may determine at least one string selection line of the plurality of string selection lines SSL as a selected string selection line, and may determine at least one ground selection line of the plurality of ground selection lines GSL as a selected ground selection line, based on the row address R_ADDR.

The voltage generator 550 may generate voltages VS that are utilized for an operation of the nonvolatile memory 500 based on a power voltage PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is utilized for the data erase operation based on the power voltage PWR and the control signals CON.

The page buffer circuit 530 may be connected to the memory cell array 510 via the plurality of bitlines BL. The page buffer circuit 530 may include a plurality of page buffers. The page buffer circuit 530 may store data DAT to be programmed into the memory cell array 510 or may read data DAT sensed from the memory cell array 510. For example, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Figure 11:
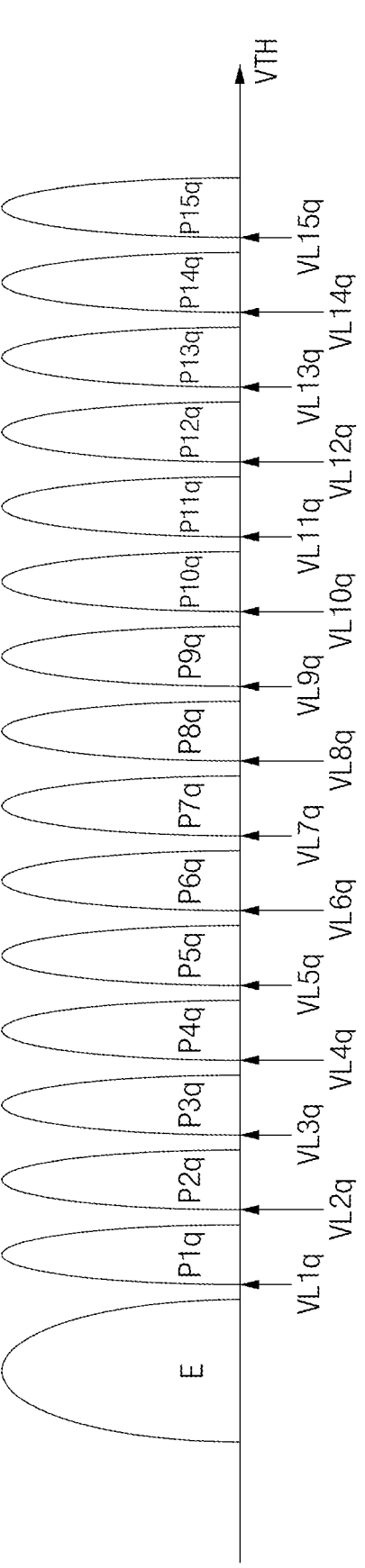

Referring to FIG. 11, an example of a threshold voltage distribution where 4-bit data are stored in memory cells, e.g., where each memory cell is a QLC that stores data having four bits, is illustrated.

Each QLC may be programmed to have one of a plurality of states E, P1q, P2q, P3q, P4q, P5q, P6q, P7q, P8q, P9q, P10q, P11q, P12q, P13q, P14q and P15q, and a threshold voltage distribution of QLCs may include a plurality of states E and P1q to P15q. For example, the state E may represent an erase state, and the states P1q to P15q may represent a plurality of program states. A plurality of threshold voltage levels VL1q, VL2q, VL3q, VL4q, VL5q, VL6q, VL7q, VL8q, VL9q, VL10q, VL11q, VL12q, VL13q, VL14q and VL15q may be used to distinguish the plurality of states E and P1q to P15q. For example, it may be distinguished using the threshold voltage level VL1q whether the memory cell is in the erase state E or the program state P1q.

However, the present disclosure is not limited to a QLC, and each memory cell included in the nonvolatile memory may be any multi-bit cell that stores data having k bits and is programmed to have one of $2^k$ states.

Although the nonvolatile memory is described based on a NAND flash memory, the nonvolatile memory may be any nonvolatile memory, e.g., a phase random access memory (PRAM), a resistive random access memory (RRAM), a magnetic random access memory (MRAM), a ferroelectric random access memory (FRAM), etc. Although the memory cell is described based on a QLC, the memory cell included in the nonvolatile memory may be any multi-bit cell that stores X-bit data and is programmed to have one of $2^X$ states, where X is a positive integer greater than or equal to four. In some implementations, the memory cell included in the nonvolatile memory may be a multi-level cell (MLC) that stores data having two bits, or a triple-level cell (TLC) that stores data having three bits.

Figure 12:
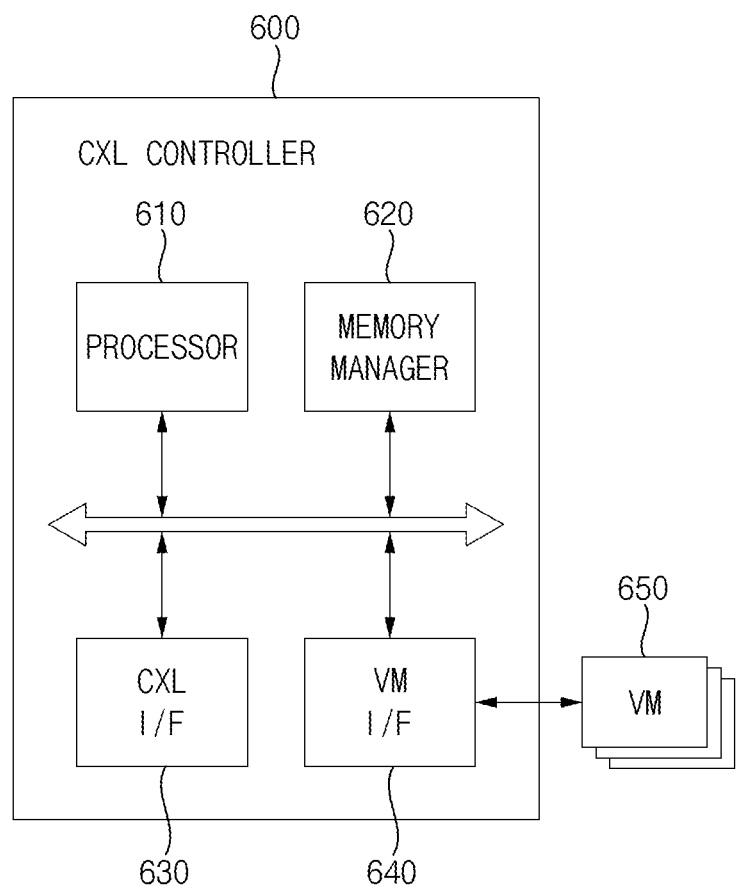
FIGS. 12 and 13 are diagrams illustrating an example of a CXL memory expander and a volatile memory included in a storage system.
Figure 13:
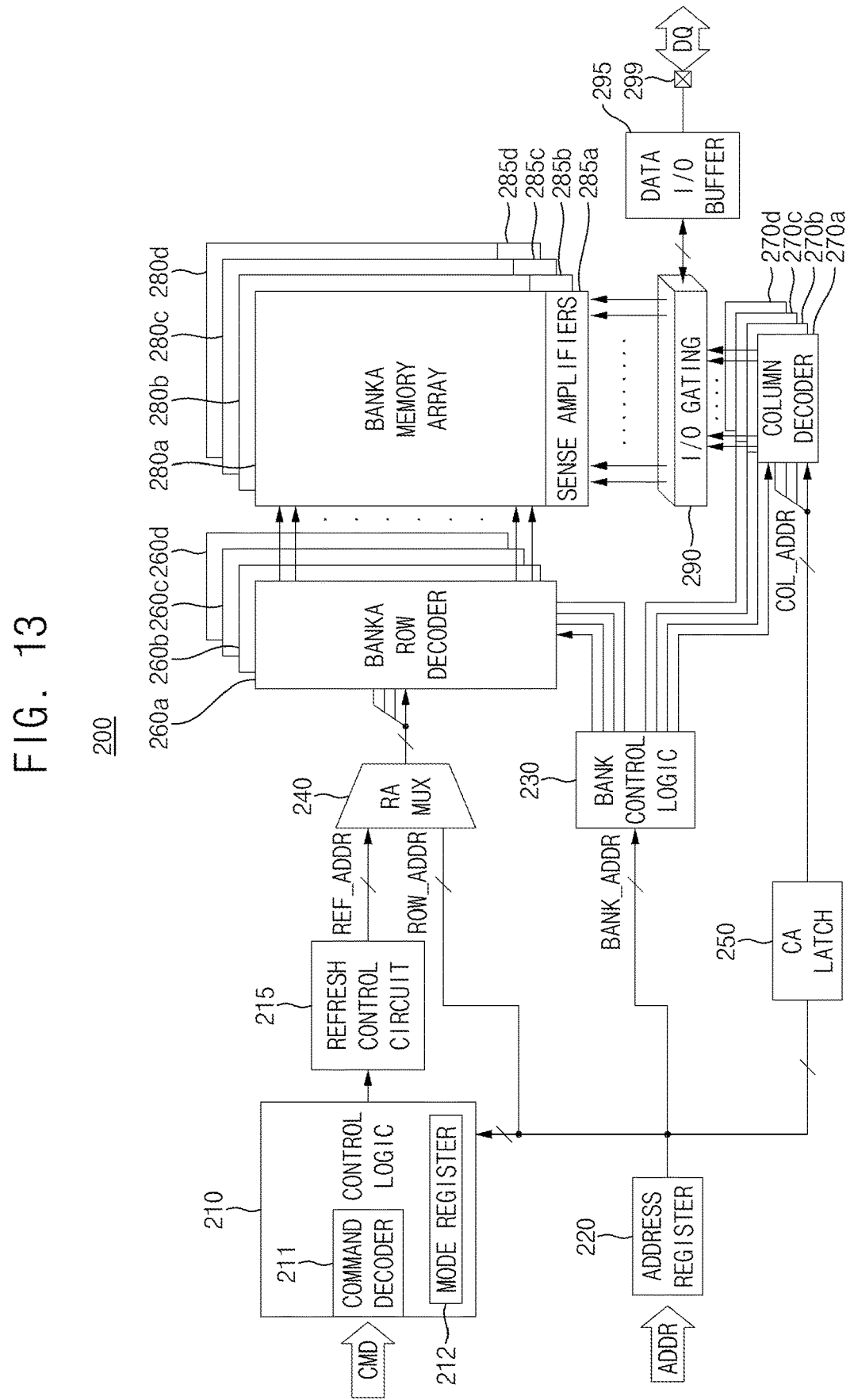

FIGS. 12 and 13 are diagrams illustrating an example of a CXL memory expander and a volatile memory included in a storage system.

Referring to FIG. 12, a CXL memory expander (e.g., the CXL memory expander 140 in FIG. 1) includes a CXL controller 600 and a plurality of volatile memories 650. The CXL controller 600 includes a processor 610, a memory manager 620, a CXL interface 630, and a volatile memory interface 640. Although not illustrated in FIG. 12, the CXL controller 600 may further include an ECC engine, an AES engine, etc.

The processor 610 may control an operation of the CXL controller 600 in response to a request or command received via the CXL interface 630 from a host device (e.g., the host device 110 in FIG. 1).

The memory manager 620 may convert memory addresses (e.g., logical addresses or virtual addresses) accessed from the host device into physical addresses for the volatile memories 650.

The CXL interface 630 may provide physical connections between the host device and the CXL memory expander. For example, the host device and the CXL memory expander may communicate with each other using CXL.io, which is an I/O protocol. For example, the host device and the CXL memory expander may communicate with each other using CXL.mem, which is a memory access protocol. For example, CXL.io may be a PCIe-based inconsistent I/O protocol, and CXL.mem may be a protocol that supports an access to memory. The above-described access types (e.g., CXL.io and CXL.mem) are merely exemplary, and the present disclosure is not limited thereto.

The volatile memory interface 640 may exchange data with the volatile memories 650. The volatile memory interface 640 may transfer data to the volatile memories 650 or may receive data read from the volatile memories 650.

Referring to FIG. 13, a volatile memory 200 may include a control logic 210, a refresh control circuit 215, an address register 220, a bank control logic 230, a row address multiplexer 240, a column address latch 250, a row decoder, a column decoder, a memory cell array, a sense amplifier unit, an I/O gating circuit 290, a data I/O buffer 295 and a data I/O pad 299.

The memory cell array may include a plurality of memory cells. The memory cell array may include a plurality of bank arrays, e.g., first to fourth bank arrays 280a, 280b, 280c and 280d. The row decoder may include a plurality of bank row decoders, e.g., first to fourth bank row decoders 260a, 260b, 260c and 260d connected to the first to fourth bank arrays 280a, 280b, 280c and 280d, respectively. The column decoder may include a plurality of bank column decoders, e.g., first to fourth bank column decoders 270a, 270b, 270c and 270d connected to the first to fourth bank arrays 280a, 280b, 280c and 280d, respectively. The sense amplifier unit may include a plurality of bank sense amplifiers, e.g., first to fourth bank sense amplifiers 285a, 285b, 285c and 285d connected to the first to fourth bank arrays 280a, 280b, 280c and 280d, respectively.

The address register 220 may receive an address ADDR including a bank address BANK_ADDR, a row address ROW_ADDR and a column address COL_ADDR from outside of the volatile memory 200 (e.g., from the CXL controller 600 in FIG. 12).

The bank control logic 230 may generate bank control signals in response to receipt of the bank address BANK_ADDR. One bank row decoder and one bank column decoder corresponding to the received bank address BANK_ADDR may be activated in response to the bank control signals.

The refresh control circuit 215 may generate a refresh address REF_ADDR in response to receipt of a refresh command or entrance of any self-refresh mode.

The row address multiplexer 240 may receive the row address ROW_ADDR from the address register 220, may receive the refresh address REF_ADDR from the refresh control circuit 215, and may selectively output the row address ROW_ADDR or the refresh address REF_ADDR.

The activated bank row decoder may decode the row address output from the row address multiplexer 240 and may activate a wordline corresponding to the row address.

The column address latch 250 may receive the column address COL_ADDR from the address register 220 and may temporarily store the received column address COL_ADDR.

The activated bank column decoder may decode the column address COL_ADDR output from the column address latch 250 and may control the I/O gating circuit 290 to output data corresponding to the column address COL_ADDR.

The I/O gating circuit 290 may include a circuitry for gating I/O data. For example, although not illustrated, the I/O gating circuit 290 may include an input data mask logic, read data latches for storing data output from the first to fourth bank arrays 280a to 280d, and write drivers for writing data to the first to fourth bank arrays 280a to 280d.

Data DQ to be read from one of the first to fourth bank arrays 280a to 280d may be sensed by a sense amplifier coupled to the one bank array and may be stored in the read data latches. The data DQ stored in the read data latches may be provided to the memory controller via the data I/O buffer 295 and the data I/O pad 299. Data DQ received via the data I/O pad 299 that are to be written to one of the first to fourth bank arrays 280a to 280d may be provided from the memory controller to the data I/O buffer 295. The data DQ received via the data I/O pad 299 and provided to the data I/O buffer 295 may be written to the one bank array via the write drivers in the I/O gating circuit 290.

The control logic 210 may control an operation of the volatile memory 200. For example, the control logic 210 may generate control signals for the volatile memory 200 to perform a data write operation or a data read operation. For example, the control logic 210 may include a command decoder 211 and a mode register 212.

Although the volatile memory is described based on a DRAM, the volatile memory may be any volatile memory.

Figure 14:
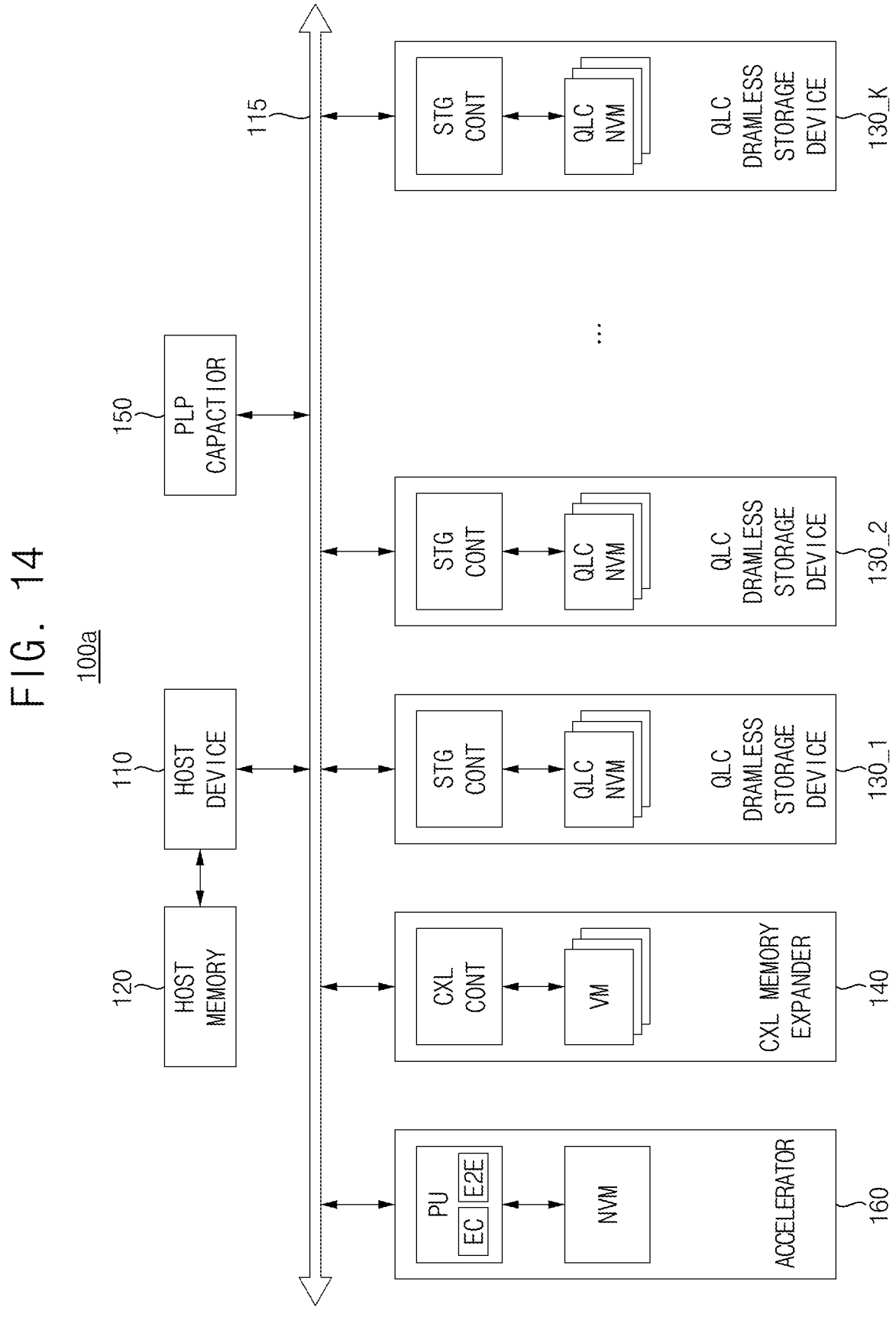
FIG. 14 is a block diagram illustrating an example of a storage system.

FIG. 14 is a block diagram illustrating an example of a storage system. The descriptions repeated with FIG. 1 will be omitted.

Referring to FIG. 14, a storage system 100a includes a plurality of DRAM-less storage devices 130_1 to 130_K, at least one CXL memory expander 140, and a PLP capacitor 150. The storage system 100a may further include a host device 110, a bus 115, a host memory 120, and at least one accelerator 160.

The storage system 100a may be substantially the same as the storage system 100 of FIG. 1, except that the storage system 100a further includes the at least one accelerator 160. For convenience of illustration, only one accelerator 160 is illustrated in FIG. 14, however, the storage system 100a may include two or more accelerators.

The accelerator 160, the plurality of DRAM-less storage devices 130_1 to 130_K, and the CXL memory expander 140 may be connected to each other and may communicate with each other through the bus 115. The accelerator 160 may be formed separately, independently and individually from the host device 110, and may perform a data processing function. The accelerator 160 may include a processing unit PU that performs the data processing function, and at least one nonvolatile memory NVM that performs a data storage function. For example, the processing unit PU may have a type different from that of the processing unit included in the host device 110. For example, the processing unit PU may be at least one of various processing units, e.g., a graphic processing unit (GPU), a tensor processing unit (TPU), a neural processing unit (NPU), a vision processing unit (VPU), etc.

The accelerator 160, e.g., the processing unit PU included in the accelerator 160, may perform at least one of an erasure code function EC and an end-to-end data protection function E2E for the plurality of DRAM-less storage devices 130_1 to 130_K, and thus data integrity problem associated with the data stored in the plurality of DRAM-less storage devices 130_1 to 130_K may be prevented. In other words, errors occurring in the data stored in the plurality of DRAM-less storage devices 130_1 to 130_K may be efficiently recovered or restored by the erasure code function EC and/or the end-to-end data protection function E2E.

In coding theory, an erasure code is a forward error correction (FEC) code under the assumption of bit erasures (rather than bit errors), which transforms a message of k symbols into a longer message (codeword) with n symbols such that the original message can be recovered from a subset of the n symbols. The fraction r=k/n is called the code rate. The fraction k'/k is called reception efficiency, where k' denotes the number of symbols required for recovery.

An end-to-end protection mechanism protects the safety-related data exchange at run time against the effects of faults within the communication link. By using end-to-end protection mechanism, faults in the communication link can be detected and handled at run time. An end-to-end encryption is a method of secure communication that prevents third parties from accessing data while it is transferred from one end system or device to another. In end-to-end encryption, the data is encrypted on the sender's system or device, and only the intended recipient can decrypt it. As it travels to its destination, the message cannot be read or tampered with by an internet service provider (ISP), application service provider, hacker or any other entity or service.

Figure 15:
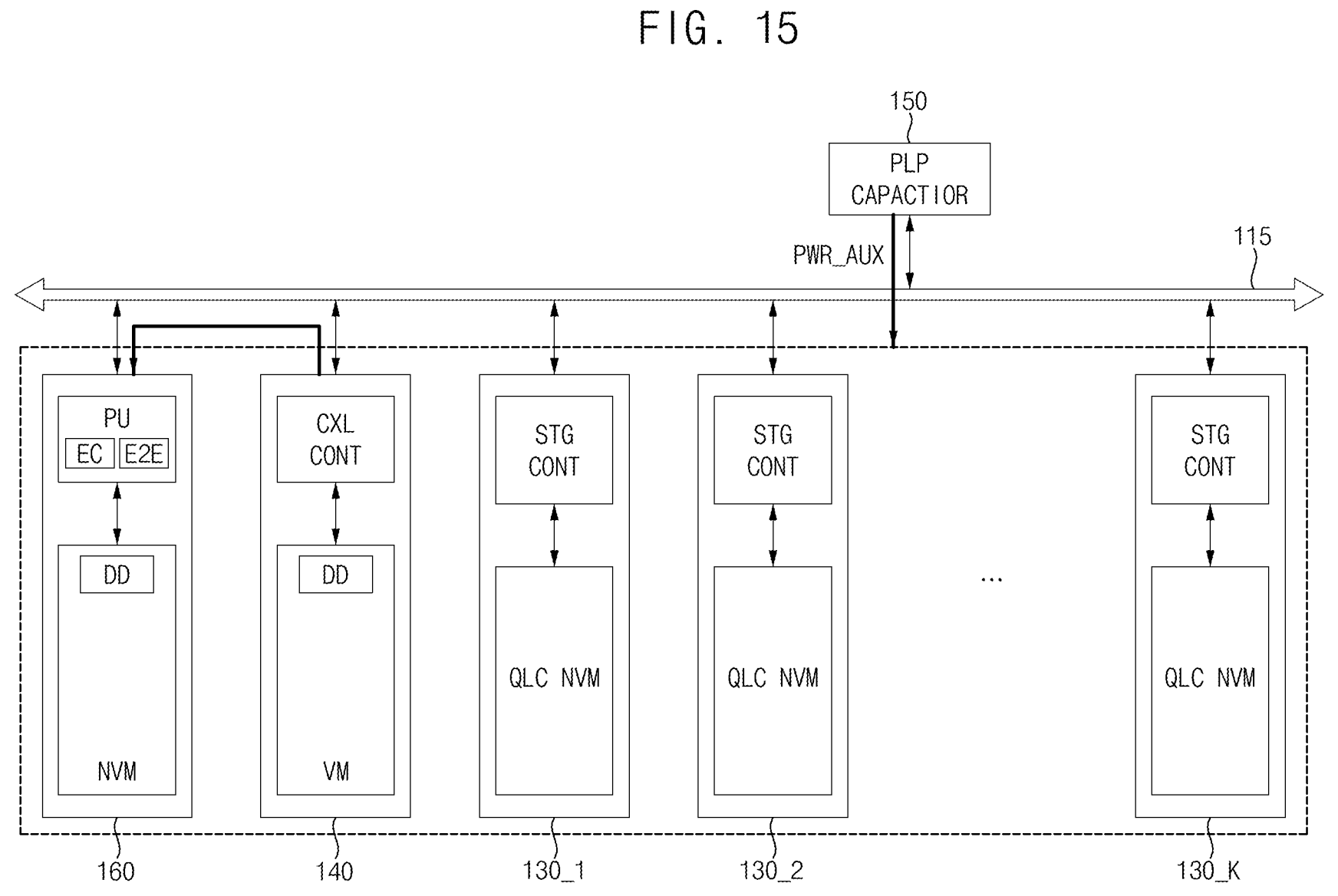

FIG. 15 is a diagram for describing an example of an operation of the storage system of FIG. 14. The descriptions repeated with FIGS. 5A and 5B will be omitted.

Referring to FIG. 15, an example of an operation of supplying an auxiliary power voltage PWR_AUX using the PLP capacitor 150 in FIG. 14 is illustrated. When the supply of the external power voltage VEXT is blocked (e.g., when the SPO situation occurs), data DD stored in the CXL memory expander 140 may be flushed to the accelerator 160. For example, the data DD stored in the volatile memory VM of the CXL memory expander 140 may be flushed to the nonvolatile memory NVM of the accelerator 160.

Figure 16:
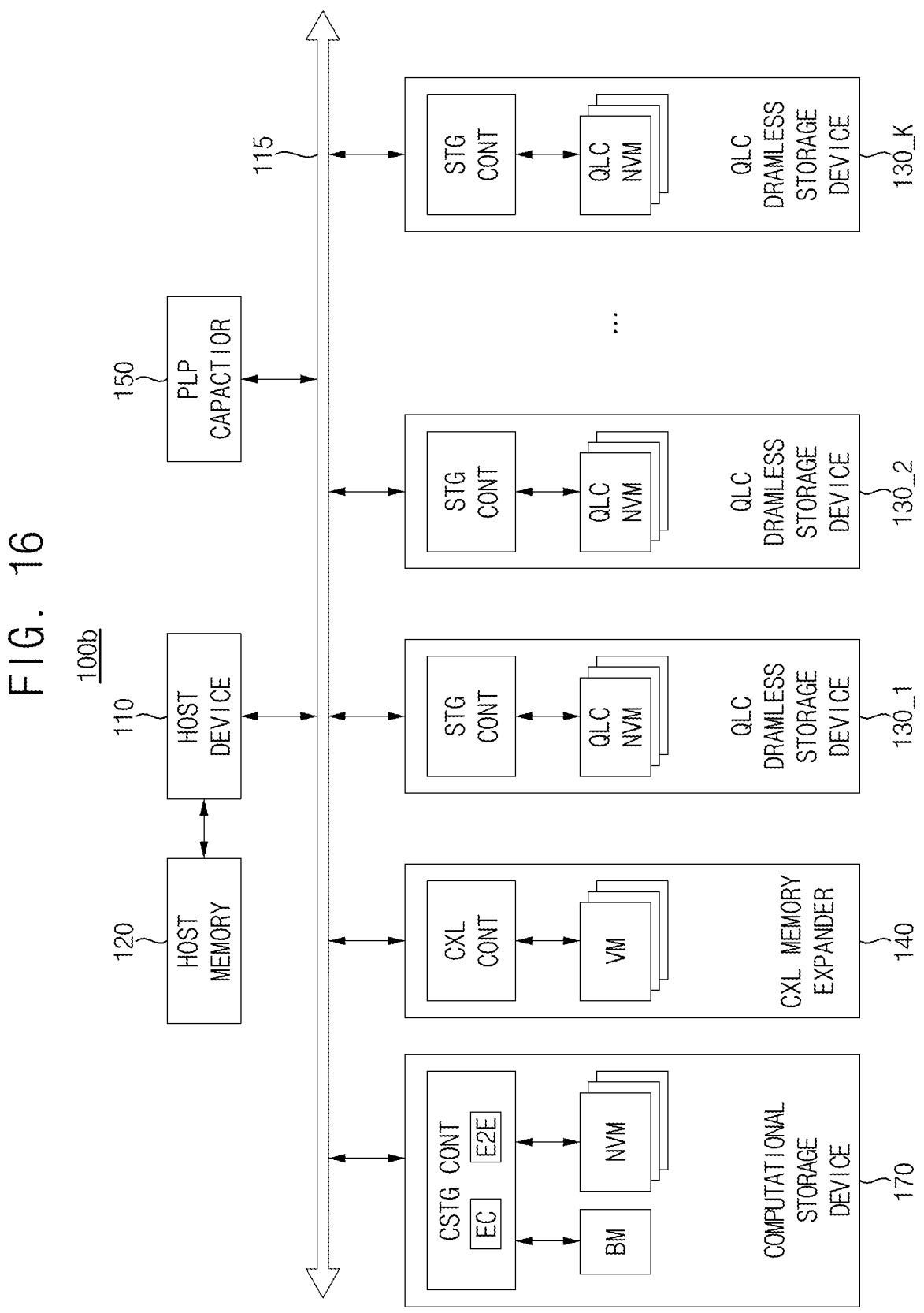
FIG. 16 is a block diagram illustrating an example of a storage system.

FIG. 16 is a block diagram illustrating an example of a storage system. The descriptions repeated with FIGS. 1 and 14 will be omitted.

Referring to FIG. 16, a storage system 100b includes a plurality of DRAM-less storage devices 130_1 to 130_K, at least one CXL memory expander 140, and a PLP capacitor 150. The storage system 100b may further include a host device 110, a bus 115, a host memory 120, and at least one computational storage device 170.

The storage system 100b may be substantially the same as the storage system 100 of FIG. 1, except that the storage system 100b further includes the at least one computational storage device 170. For convenience of illustration, only one computational storage device 170 is illustrated in FIG. 16, however, the storage system 100b may include two or more computational storage devices.

The computational storage device 170, the plurality of DRAM-less storage devices 130_1 to 130_K, and the CXL memory expander 140 may be connected to each other and may communicate with each other through the bus 115. The computational storage device 170 may be formed separately, independently and individually from the plurality of DRAM-less storage devices 130_1 to 130_K and may perform a data storage function and a data processing function together. The computational storage device 170 may include a computational storage controller CSTG CONT that controls an operation of the computational storage device 170, a plurality of nonvolatile memories NVM that store data, and a buffer memory BM that temporarily stores data.

Unlike a general storage device that only performs a data storage function, a computational storage device may perform both a data storage function and a data processing function together. To perform the data storage function and the data processing function together, the computational storage device may include a hardware element and/or a software program for performing the data processing function.

The computational storage device 170, e.g., the computational storage controller CSTG CONT included in the computational storage device 170, may perform at least one of an erasure code function EC and an end-to-end data protection function E2E for the plurality of DRAM-less storage devices 130_1 to 130_K, and thus data integrity problem associated with the data stored in the plurality of DRAM-less storage devices 130_1 to 130_K may be prevented.

Figure 17:
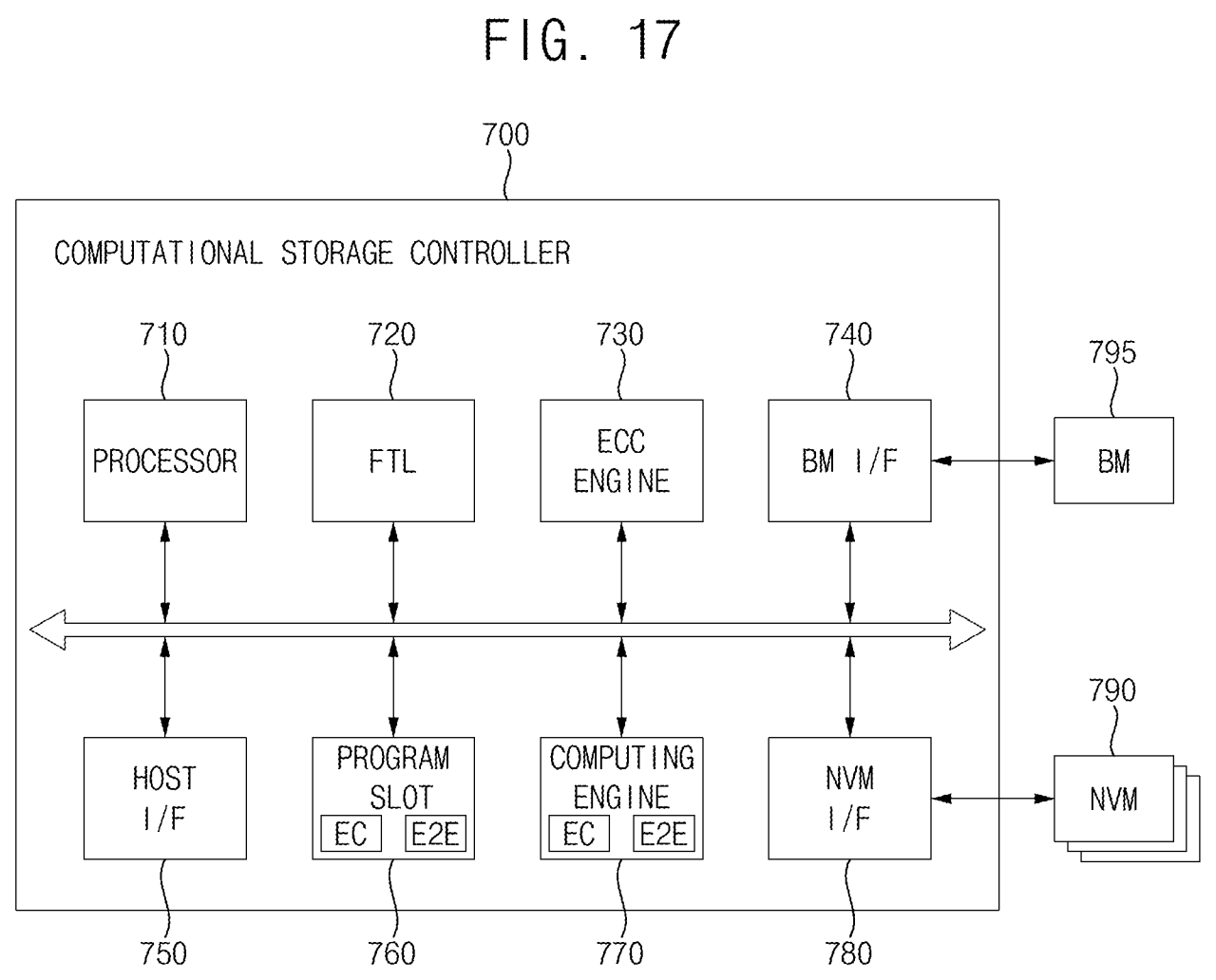

FIG. 17 is a diagram illustrating an example of a computational storage device included in a storage system. The descriptions repeated with FIG. 8 will be omitted.

Referring to FIG. 17, a computational storage device (e.g., the computational storage device 170 in FIG. 16) may include a computational storage controller 700, a plurality of nonvolatile memories 790, and a buffer memory 795. The computational storage controller 700 may include a processor 710, an FTL 720, an ECC engine 730, a buffer memory interface 740, a host interface 750, a program slot 760, a computing engine 770, and a nonvolatile memory interface 780.

The processor 710, the FTL 720, the ECC engine 730, the host interface 750, and the nonvolatile memory interface 780 may be substantially the same as the processor 310, the FTL 320, the ECC engine 330, the host interface 340, and the nonvolatile memory interface 350 in FIG. 8, respectively. The nonvolatile memories 790 may be similar to the nonvolatile memories 360 in FIG. 8 and may be implemented similarly to those described with reference to FIG. 10. For example, each of the nonvolatile memories 790 may include single-level cells (SLCs) that store 1-bit data, or may include multi-bit cells that store fewer bits of data than the memory cells in the nonvolatile memories QLC NVM of the DRAM-less storage devices 130_1 to 130_K. The buffer memory 795 may a volatile memory and may be implemented similar to that described with reference to FIG. 13.

The buffer memory interface 740 may exchange data with the buffer memory 795. The buffer memory interface 740 may transfer data to the buffer memory 795 or may receive data read from the buffer memory 795.

The program slot 760 may store the plurality of programs. For example, the plurality of programs may include various operators such as a filter, a sum, a string concatenation, or the like, and may be implemented to perform the erasure code function EC and/or the end-to-end data protection function E2E.

The computing engine 770 may execute the plurality of programs and may generate and store a result of executing the plurality of programs. For example, the computing engine 770 may be implemented to execute the erasure code function EC and/or the end-to-end data protection function E2E. For example, the buffer memory 795 and the nonvolatile memories 790 may be used to execute the plurality of programs. For example, the computing engine 770 may include various computational resources such as an NPU, a GPU, a digital signal processor (DSP), an image signal processor (ISP), etc.

As described above, the erasure code function EC and/or the end-to-end data protection function E2E may be off-loaded to the computational storage device (e.g., to the computational storage controller 700 and the computing engine 770).

Off-loading of programs or computations represents the transfer of resource intensive computational tasks to a separate processor, such as a hardware accelerator, or an external platform, such as a cluster, a grid, or a cloud. Off-loading to a co-processor may be used to accelerate applications including image rendering and mathematical calculations. Off-loading computations to an external platform over a network may provide computing power and overcome hardware limitations of a device, such as limited computational power, storage, and energy.

Figure 18:
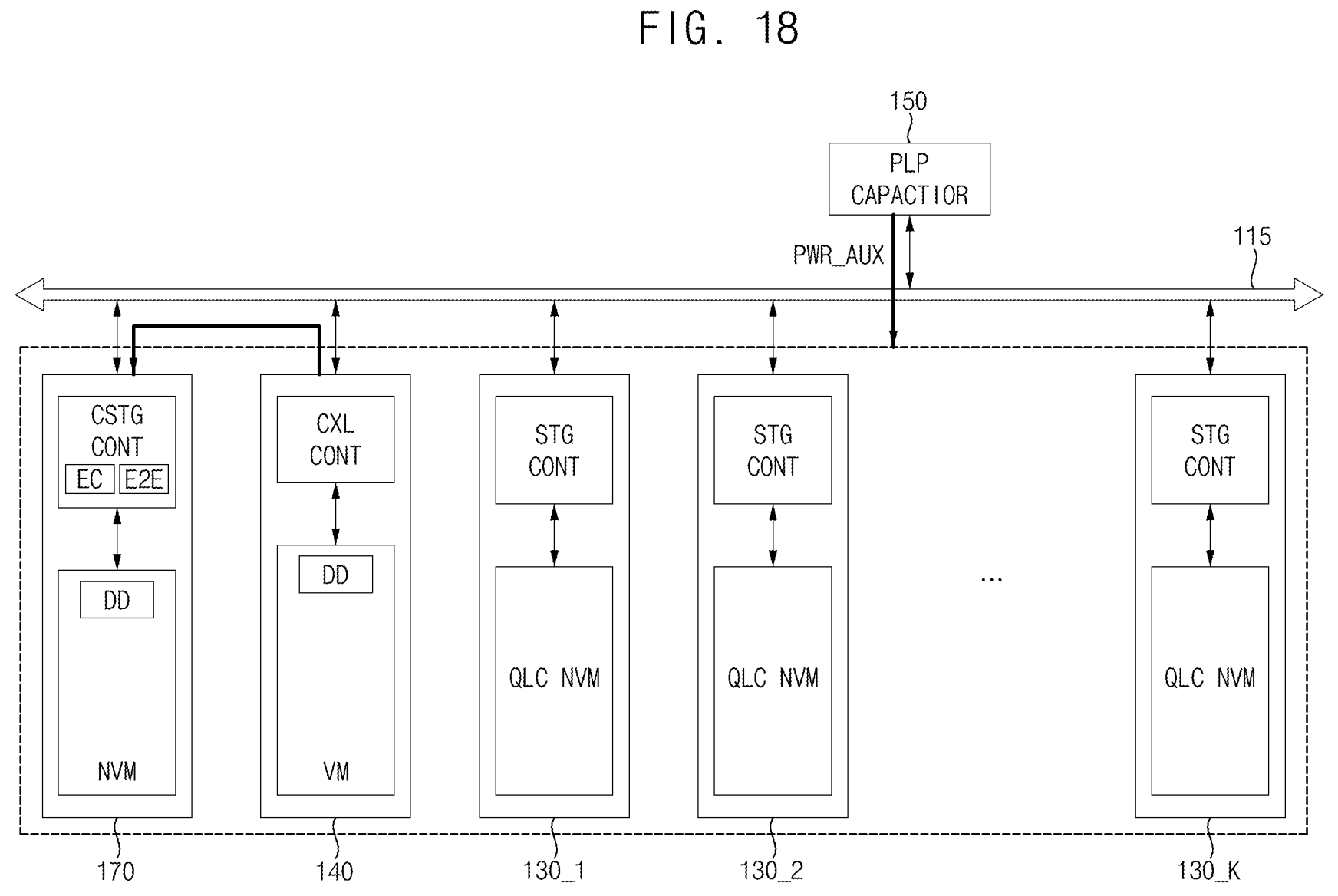

FIG. 18 is a diagram for describing an operation of the storage system of FIG. 16. The descriptions repeated with FIGS. 5A and 5B will be omitted.

Referring to FIG. 18, an example of an operation of supplying an auxiliary power voltage PWR_AUX using the PLP capacitor 150 in FIG. 16 is illustrated. When the supply of the external power voltage VEXT is blocked (e.g., when the SPO situation occurs), data DD stored in the CXL memory expander 140 may be flushed to the computational storage device 170. For example, the data DD stored in the volatile memory VM of the CXL memory expander 140 may be flushed to the nonvolatile memory NVM of the computational storage device 170.

Figure 19:
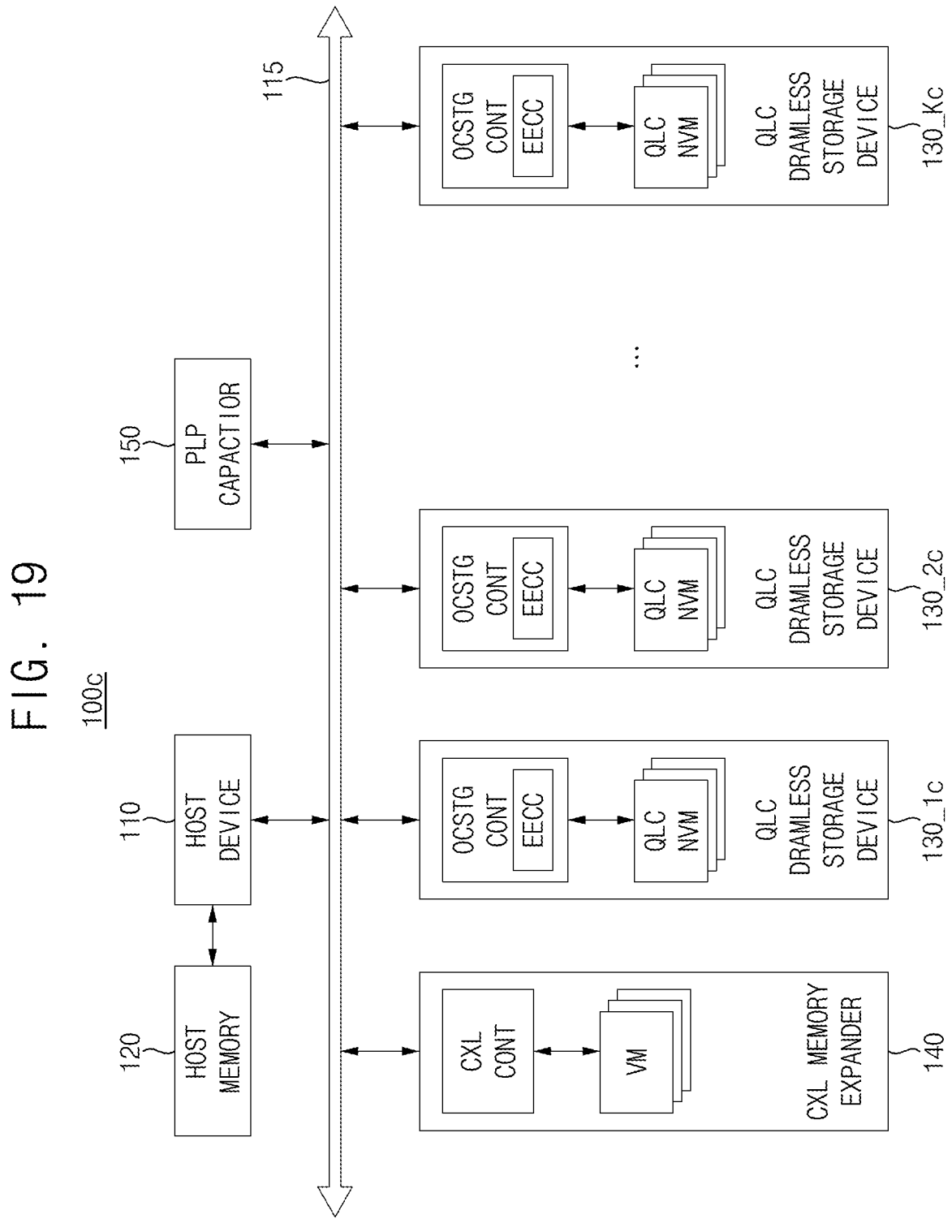
FIG. 19 is a block diagram illustrating an example of a storage system.

FIG. 19 is a block diagram illustrating an example of a storage system. The descriptions repeated with FIG. 1 will be omitted.

Referring to FIG. 19, a storage system 100c includes a plurality of DRAM-less storage devices 130_1c, 130_2c, . . . , 130_Kc, at least one CXL memory expander 140, and a PLP capacitor 150. The storage system 100c may further include a host device 110, a bus 115, and a host memory 120.

The storage system 100c may be substantially the same as the storage system 100 of FIG. 1, except that configurations of the plurality of DRAM-less storage devices 130_1c to 130_Kc are partially changed.

The plurality of DRAM-less storage devices 130_1c to 130_Kc may be implemented in an open channel form. For example, each of the plurality of DRAM-less storage devices 130_1c to 130_Kc may include an open channel storage controller OCSTG CONT that controls operations of the plurality of DRAM-less storage devices 130_1c to 130_Kc, rather than the storage controller STG CONT.

The open channel storage controller OCSTG CONT may perform an enhanced ECC function EECC for the plurality of DRAM-less storage devices 130_1c to 130_Kc, and thus data integrity problem associated with data stored in the plurality of DRAM-less storage devices 130_1c to 130_Kc may be prevented.

Figure 20:
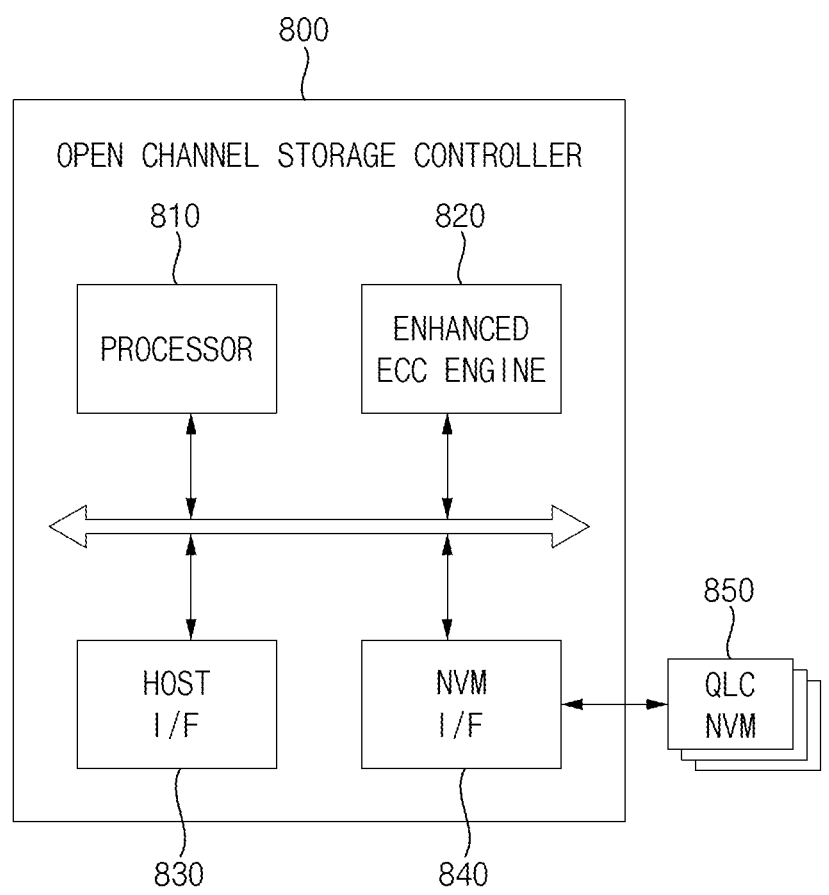

FIGS. 20 and 21 are diagrams illustrating an example of a DRAM-less storage device included in the storage system of FIG. 19. The descriptions repeated with FIGS. 8 and 9 will be omitted.

Referring to FIG. 20, a DRAM-less storage device (e.g., the DRAM-less storage device 130_1c in FIG. 19) includes an open channel storage controller 800 and a plurality of nonvolatile memories 850. The open channel storage controller 800 may include a processor 810, an enhanced ECC engine 820, a host interface 830, and a nonvolatile memory interface 840.

The processor 810, the host interface 830, the nonvolatile memory interface 840 and the nonvolatile memories 850 may be substantially the same as the processor 310, the host interface 340, the nonvolatile memory interface 350 and the nonvolatile memories 360m in FIG. 8, respectively.

The enhanced ECC engine 820 may perform ECC encoding and ECC decoding similar to the ECC engine 330 in FIG. 8 and may perform more powerful error correction as compared with the ECC engine 330 in FIG. 8. For example, when the ECC engine 330 performs 1-bit error correction, the enhanced ECC engine 820 may perform 2-bit error correction.

Referring to FIG. 21, an example of a software hierarchical structure of a host OS 910 executed by a host device (e.g., the host device 110 in FIG. 19) and a storage FW 930 executed by a DRAM-less storage device (e.g., the DRAM-less storage device 130_1c in FIG. 19) is illustrated.

The host OS 910 may include an application 921, a file system 922, a block layer 923, a device driver 924 and an FTL 925. The storage FW 930 may include a HIL 941, a device manager 943 and a low level driver 944. The application 921, the file system 922, the block layer 923, the device driver 924, the HIL 941, the FTL 925, the device manager 943, and the low level driver 944 may be substantially the same as the application 421, the file system 422, the block layer 423, the device driver 424, the HIL 441, the FTL 442, the device manager 443, and the low level driver 444 in FIG. 9, respectively.

As compared with the storage controller 300 of FIG. 8, the FTL 320 may be omitted and the ECC engine 330 may be replaced with the enhanced ECC engine 820 in the open channel storage controller 800 of FIG. 20. In addition, as compared with the example of FIG. 9, the FTL 925 may be included in the host OS 910 in the example of FIG. 21. In other words, an FTL function for the plurality of DRAM-less storage devices 130_1c to 130_Kc may be performed by the host device, and the open channel storage controller 800 may perform the enhanced ECC function rather than the FTL function.

Figure 22:
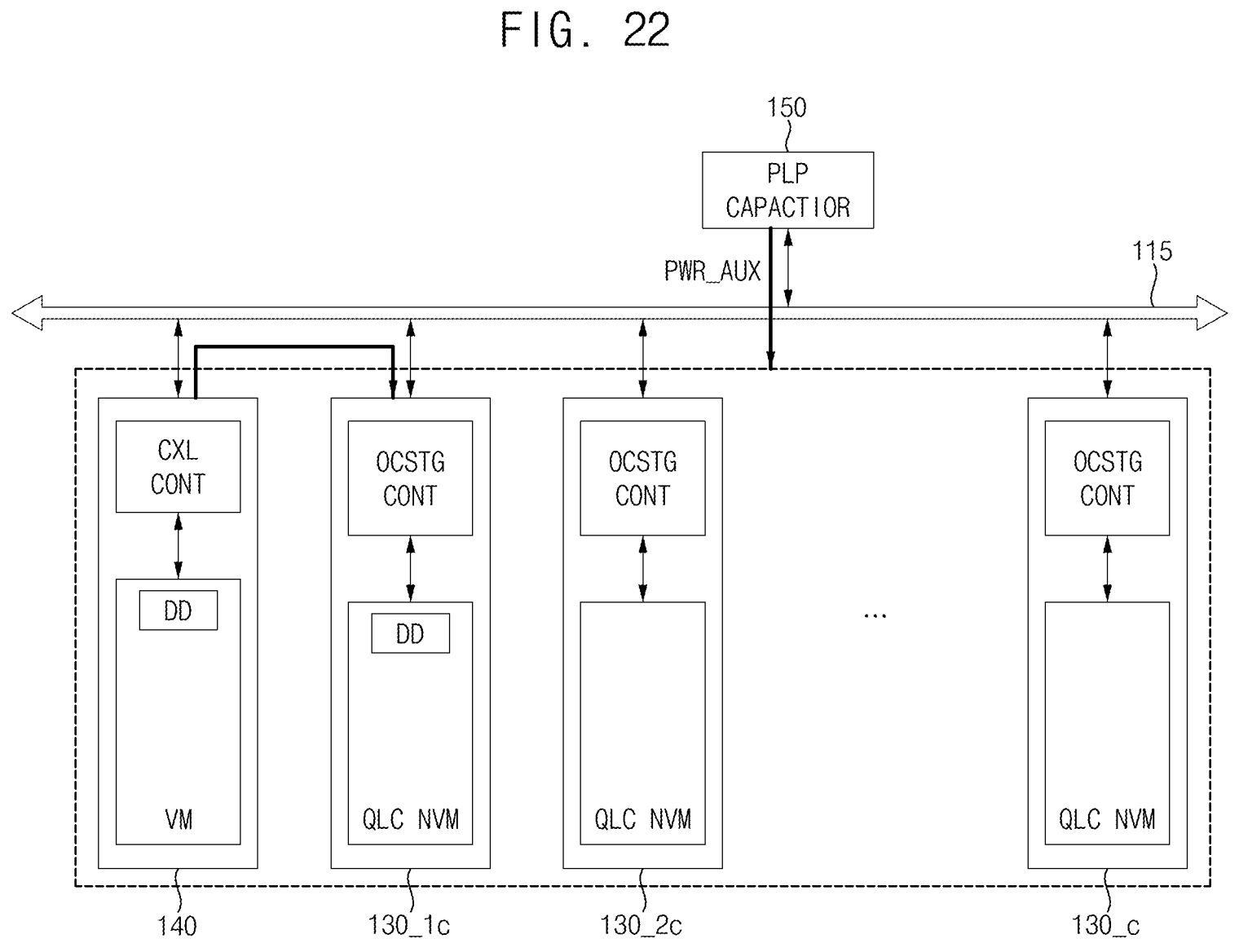

FIG. 22 is a diagram for describing an example of an operation of the storage system of FIG. 19. The descriptions repeated with FIGS. 5A and 5B will be omitted.

Referring to FIG. 22, an example of an operation of supplying an auxiliary power voltage PWR_AUX using the PLP capacitor 150 in FIG. 19 is illustrated. When the supply of the external power voltage VEXT is blocked (e.g., when the SPO situation occurs), data DD stored in the CXL memory expander 140 may be flushed to at least one of the DRAM-less storage devices 130_1c to 130_Kc. For example, the data DD stored in the volatile memory VM of the CXL memory expander 140 may be flushed to the nonvolatile memory QLC NVM of the DRAM-less storage device 130_1c.

The DRAM-less storage device includes multi-bit cell nonvolatile memories as storage media to reduce manufacturing costs. In this case, there is a problem in that a possibility of data integrity being damaged is relatively high due to multiple distributions of the nonvolatile memories.

In the storage systems 100a, 100b and 100c, the erasure code function EC and/or the end-to-end data protection function E2E may be performed by the accelerator 160 and/or the computational storage device 170 that are separately from the plurality of DRAM-less storage devices 130_1 to 130_K, or the plurality of DRAM-less storage devices 130_1c to 130_Kc may perform the enhanced ECC function EECC by itself. Accordingly, the data integrity problem may be prevented.

Figure 24:
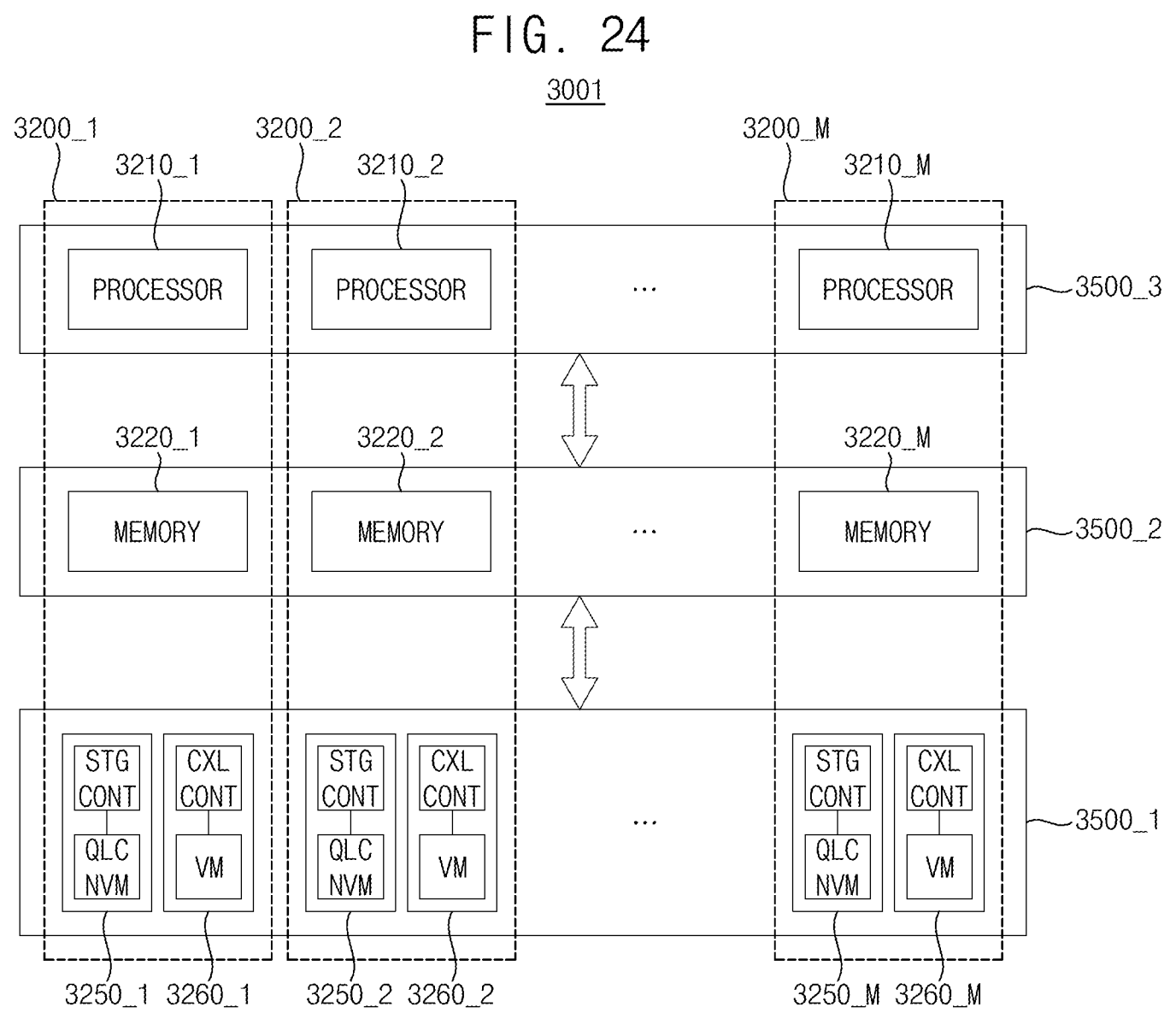

FIGS. 23 and 24 are block diagrams illustrating an example of a data center including a storage system.

Referring to FIG. 23, a data center 3000 may be a facility that collects various types of data and provides various services and may be referred to as a data storage center or a server system. The data center 3000 may be a system for operating search engines and databases and may be a computing system used by companies such as banks or government agencies. The data center 3000 may include a plurality of application servers 3100_1, 3100_2, . . . , 3100_N, and a plurality of storage servers 3200_1, 3200_2, . . . , 3200_M, where each of N and M is a positive integer greater than or equal to two. For example, the plurality of application servers 3100_1 to 3100_N may include first to N-th application servers, and the plurality of storage servers 3200_1 to 3200_M may include first to M-th storage servers. The number of the application servers 3100_1 to 3100_N and the number of the storage servers 3200_1 to 3200_M may be variously selected, and the number of the application servers 3100_1 to 3100_N and the number of the storage servers 3200_1 to 3200_M may be different from each other.

Hereinafter, examples will be described based on the first storage server 3200_1. The application servers 3100_1 to 3100_N and the storage servers 3200_1 to 3200_M may have similar structures, and the application servers 3100_1 to 3100_N and the storage servers 3200_1 to 3200_M may communicate with each other through a network 3300.

The first storage server 3200_1 may include a first processor 3210_1, a first memory 3220_1, a first switch 3230_1, a first network interface card (NIC) 3240_1, a first DRAM-less storage device 3250_1, and a first CXL memory expander 3260_1. The first processor 3210_1 may control overall operations of the first storage server 3200_1 and may access the first memory 3220_1 to execute instructions and/or data loaded in the first memory 3220_1. For example, the first memory 3220_1 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors and the number of the memories included in the first storage server 3200_1 may be variously selected.

In some implementations, the first processor 3210_1 and the first memory 3220_1 may provide a processor-memory pair. In some implementations, the number of the processors and the number of the memories included in the first storage server 3200_1 may be different from each other. The first processor 3210_1 may include a single core processor or a multiple core processor. The above description of the first storage server 3200_1 may be similarly applied to each of the application servers 3100_1 to 3100_N.

The first switch 3230_1 may route or relay communications between various components included in the first storage server 3200_1. The first NIC 3240_1, the first DRAM-less storage device 3250_1, and the first CXL memory expander 3260_1 may be connected to the first switch 3230_1. The first NIC 3240_1 may communicate with the other storage servers 3200_2 to 3200_M and/or the other application servers 3100_1 to 3100_N through the network 3300. The first DRAM-less storage device 3250_1 may store data. The first CXL memory expander 3260_1 may operate as a buffer memory for the first DRAM-less storage device 3250_1.

The first storage server 3200_1 may be implemented in the form of the storage system. For example, the first processor 3210_1, the first memory 3220_1, the first DRAM-less storage device 3250_1, and the first CXL memory expander 3260_1 may correspond to the host device 110, the host memory 120, the DRAM-less storage devices 130_1 to 130_K, and the CXL memory expander 140 in FIG. 1, respectively. The first storage server 3200_1 may have improved performance with relatively large storage capacity and low manufacturing cost.

Referring to FIG. 24, a data center 3001 may be implemented with a rack scale architecture (RSA) and/or a disaggregated architecture. For convenience of illustration, only some components included in the storage servers 3200_1 to 3200_M are illustrated.

A first storage server 3200_1 may include a first processor 3210_1, a first memory 3220_1, a first DRAM-less storage device 3250_1, and a first CXL memory expander 3260_1. A second storage server 3200_2 may include a second processor 3210_2, a second memory 3220_2, a second DRAM-less storage device 3250_2, and a second CXL memory expander 3260_2. An M-th storage server 3200_M may include an M-th processor 3210_M, an M-th memory 3220_M, an M-th DRAM-less storage device 3250_M, and an M-th CXL memory expander 3260_M.

The DRAM-less storage devices 3250_1 to 3250_M and the CXL memory expanders 3260_1 to 3260_M may be mounted on a first server rack 3500_1. The memories 3220_1 to 3220_M may be mounted on a second server rack 3500_2 that is formed separately from the first server rack 3500_1. The processors 3210_1 to 3210_M may be mounted on a third server rack 3500_3 that is formed separately from the first and second server racks 3500_1 and 3500_2.

A disaggregated server architecture has been studied and/or adopted for efficient server resource management. In a general server architecture, a processor, a memory, storage devices, etc. are placed within one server and connected directly to each other. In contrast, in a disaggregated server architecture, components of the same type may be placed together to provide a shared pool, and components may be connected to each other based on various interconnect technologies. For example, a disaggregated server architecture may be implemented in the form of a network-attached system in which components are connected to each other through various wired and wireless networks, or a fabric-attached system in which components are connected to each other through various fabric interconnects, or the like.

The disclosed examples may be applied to various electronic devices and systems that include the storage devices and the storage systems.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A storage system comprising:
a plurality of dynamic random access memory (DRAM)-less storage devices, each DRAM-less storage device of the plurality of DRAM-less storage devices including a plurality of nonvolatile memories;
at least one compute express link (CXL) memory expander electrically connected to the plurality of DRAM-less storage devices, the at least one CXL memory expander configured to communicate through a CXL interface and to operate as a buffer memory of the plurality of DRAM-less storage devices;
and
a power loss protection (PLP) capacitor electrically connected to the plurality of DRAM-less storage devices and the at least one CXL memory expander and disposed outside the plurality of DRAM-less storage devices, the PLP capacitor configured to supply an auxiliary power voltage to the plurality of DRAM-less storage devices and the at least one CXL memory expander in a sudden power-off (SPO) condition,
wherein the at least one CXL memory expander includes a first memory region allocated for the plurality of DRAM-less storage devices, and
wherein the first memory region is configured to store mapping data including a mapping relationship between logical addresses of a host device and physical addresses of a plurality of user data stored in the plurality of nonvolatile memories.

2. The storage system of claim 1, wherein the first memory region is set in an initial operation time of the storage system.

3. The storage system of claim 1, further comprising a host device configured to control an operation of the storage system,
wherein the at least one CXL memory expander further includes a second memory region different from the first memory region, and
wherein the second memory region is configured to be accessed and managed by the host device.

4. The storage system of claim 1, further comprising at least one accelerator electrically connected to the plurality of DRAM-less storage devices and the at least one CXL memory expander and formed separately from a host device that controls an operation of the storage system,
wherein the at least one accelerator is configured to perform a data processing function, and to perform at least one of an erasure code function and an end-to-end data protection function for the plurality of DRAM-less storage devices.

5. The storage system of claim 4, wherein, in the SPO condition, data stored in the at least one CXL memory expander is flushed to the at least one accelerator.

6. The storage system of claim 5, wherein the at least one accelerator includes at least one nonvolatile memory, and
wherein, in the SPO condition, the data stored in the at least one CXL memory expander is flushed to the at least one nonvolatile memory included in the at least one accelerator.

7. The storage system of claim 1, further comprising at least one computational storage device electrically connected to the plurality of DRAM-less storage devices and the at least one CXL memory expander and formed separately from the plurality of DRAM-less storage devices,
wherein the at least one computational storage device is configured to perform a data storage function and a data processing function together, and to perform at least one of an erasure code function and an end-to-end data protection function for the plurality of DRAM-less storage devices.

8. The storage system of claim 7, wherein, in the SPO condition, data stored in the at least one CXL memory expander is flushed to the at least one computational storage device.

9. The storage system of claim 8, wherein the at least one computational storage device includes a plurality of non-volatile memories, and wherein, in the SPO condition, the data stored in the at least one CXL memory expander is flushed to at least one nonvolatile memory of the plurality of nonvolatile memories included in the at least one computational storage device.

10. The storage system of claim 1, wherein each of the plurality of DRAM-less storage devices further includes a storage controller configured to control operations of the plurality of nonvolatile memories, and wherein the storage controller is configured to perform an enhanced error correction code (ECC) function for the plurality of DRAM-less storage devices.

11. The storage system of claim 10, wherein a flash translation layer (FTL) function for the plurality of DRAM-less storage devices is performed by a host device that controls an operation of the storage system, and wherein the storage controller is configured to perform the enhanced ECC function rather than the FTL function.

12. The storage system of claim 10, wherein, in the SPO condition, data stored in the at least one CXL memory expander is flushed to at least one nonvolatile memory of the plurality of nonvolatile memories included in the plurality of DRAM-less storage devices.

13. The storage system of claim 1, wherein write data to be written into at least one nonvolatile memory of the plurality of DRAM-less storage devices is temporarily stored in at least one CXL memory expander, and wherein a write operation in which the write data is stored in the at least one nonvolatile memory of the plurality of DRAM-less storage devices is performed using the write data temporarily stored in the at least one CXL memory expander.

14. The storage system of claim 1, wherein the plurality of nonvolatile memories included in the plurality of DRAM-less storage devices include a plurality of memory cells each of which stores data having two or more bits.

15. The storage system of claim 14, wherein each of the plurality of memory cells is a quadruple-level cell (QLC) configured to store 4-bit data.

16. The storage system of claim 1, further comprising:

a first substrate on which the plurality of DRAM-less storage devices and the at least one CXL memory expander are mounted; and a second substrate on which the PLP capacitor is mounted, the second substrate being formed separately from the first substrate.

17. The storage system of claim 16, wherein the plurality of DRAM-less storage devices and the at least one CXL memory expander have a same form factor for mounting on the first substrate.

18. A data center comprising:

a plurality of application servers configured to receive a data write request or a data read request; and a plurality of storage servers configured to store write data corresponding to the data write request or to output read data corresponding to the data read request, wherein a first storage server among the plurality of storage servers includes:

a plurality of first dynamic random access memory (DRAM)-less storage devices, each of the plurality of first DRAM-less storage devices including a plurality of nonvolatile memories;

at least one first compute express link (CXL) memory expander electrically connected to the plurality of first DRAM-less storage devices, the at least one first CXL memory expander configured to communicate through a CXL interface and to operate as a buffer memory of the plurality of first DRAM-less storage devices; and a first power loss protection (PLP) capacitor electrically connected to the plurality of first DRAM-less storage devices and the at least one first CXL memory expander and disposed outside the plurality of first DRAM-less storage devices, the first PLP capacitor configured to supply an auxiliary power voltage to the plurality of first DRAM-less storage devices and the at least one first CXL memory expander in a sudden power-off (SPO) condition, wherein the at least one first CXL memory expander includes a first memory region allocated for the plurality of first DRAM-less storage devices, and wherein the first memory region is configured to store mapping data including a mapping relationship between logical addresses of a host device and physical addresses of a plurality of user data stored in the plurality of nonvolatile memories.

19. The data center of claim 18, wherein the first storage server further includes a first host device, wherein a second storage server among the plurality of storage servers includes a second host device, a plurality of second DRAM-less storage devices and at least one second CXL memory expander, and wherein the data center further includes:

a first server rack on which the first host device and the second host device are mounted; and a second server rack on which the plurality of first DRAM-less storage devices, the at least one first CXL memory expander, the plurality of second DRAM-less storage devices and the at least one second CXL memory expander are mounted, the second server rack being formed separately from the first server rack.

20. A storage system comprising:

a host device;

a plurality of quadruple-level cell (QLC) dynamic random access memory (DRAM)-less storage devices controlled by the host device, each of the plurality of QLC DRAM-less storage devices including a plurality of QLC nonvolatile memories including a plurality of QLCs configured to store 4-bit data as a storage medium;

at least one compute express link (CXL) memory expander controlled by the host device and electrically connected to the plurality of QLC DRAM-less storage devices, the at least one CXL memory expander configured to communicate through a CXL interface and to operate as a buffer memory of the plurality of QLC DRAM-less storage devices;

at least one accelerator electrically connected to the plurality of QLC DRAM-less storage devices and the at least one CXL memory expander and formed separately from the host device, the at least one accelerator configured to perform a data processing function, and to perform at least one of an erasure code function and an end-to-end data protection function for the plurality of QLC DRAM-less storage devices; and a power loss protection (PLP) capacitor electrically connected to the plurality of QLC DRAM-less storage devices and the at least one CXL memory expander and disposed outside the plurality of QLC DRAM-less storage devices, the PLP capacitor configured to supply an auxiliary power voltage to the plurality of QLC DRAM-less storage devices and the at least one CXL memory expander in a sudden power-off (SPO) condition, wherein the at least one CXL memory expander includes:
  a first memory region for the plurality of QLC DRAM-less storage devices; and
  a second memory region configured to be accessed and managed by the host device, wherein the first memory region is configured to store mapping data including mapping information corresponding to a plurality of user data stored in the plurality of QLC nonvolatile memories included in the plurality of QLC DRAM-less storage devices, wherein the at least one accelerator includes at least one nonvolatile memory, and wherein, in the SPO condition, data stored in the at least one CXL memory expander is flushed to the at least one nonvolatile memory included in the at least one accelerator.

* * * * *